United States Patent
Sato et al.

(10) Patent No.: US 7,542,394 B2
(45) Date of Patent: Jun. 2, 2009

(54) OPTICAL INFORMATION RECORDING DEVICE FOR DETECTING INFORMATION DURING RECORDING AND METHOD THEREFOR

(75) Inventors: Yoshikazu Sato, Gunma (JP); Mitsuo Sekiguchi, Gunma (JP); Hiroya Kakimoto, Gunma (JP); Fuyuki Miyazawa, Gunma (JP); Tetsuharu Kubo, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 540 days.

(21) Appl. No.: 11/225,492

(22) Filed: Sep. 9, 2005

(65) Prior Publication Data
US 2006/0077847 A1    Apr. 13, 2006

Related U.S. Application Data

(63) Continuation of application No. 11/158,593, filed on Jun. 22, 2005, now abandoned.

(30) Foreign Application Priority Data

Jun. 24, 2004    (JP)    ............... 2004-186496
Sep. 10, 2004    (JP)    ............... 2004-264180

(51) Int. Cl.
*G11B 27/36*    (2006.01)
(52) U.S. Cl. .................. 369/59.11; 369/59.17
(58) Field of Classification Search ............... 369/47.1, 369/47.53, 48, 59.1, 59.11, 54, 47.35, 59.12, 369/59.17, 59.19, 59.21
See application file for complete search history.

(56) References Cited

U.S. PATENT DOCUMENTS

| | | | |
|---|---|---|---|
| 4,488,277 A * | 12/1984 | McFarlane et al. | ....... 369/47.28 |
| 4,494,226 A | 1/1985 | Hazel et al. | |
| 5,105,413 A * | 4/1992 | Bakx | ................ 369/53.33 |
| 5,267,226 A | 11/1993 | Matsuoka et al. | |
| 5,648,952 A * | 7/1997 | Maegawa et al. | ........... 369/116 |
| 6,034,933 A * | 3/2000 | Rokutan | ................... 369/53.27 |
| 6,680,888 B2 * | 1/2004 | Toda et al. | ............... 369/47.51 |
| 7,046,601 B2 * | 5/2006 | Kondo et al. | ............. 369/47.53 |
| 2002/0159347 A1 | 10/2002 | Sasaki et al. | |

(Continued)

FOREIGN PATENT DOCUMENTS

EP    0 404 247 A1    12/1990

(Continued)

*Primary Examiner*—Hoa T Nguyen
*Assistant Examiner*—Mark Fischer
(74) *Attorney, Agent, or Firm*—Knobbe Martens Olson & Bear LLP

(57) ABSTRACT

The invention provides a method effective in detecting a reproduction signal in real time correction in which correction is simultaneously performed with recording. In this method, a laser beam emitted from a laser diode 110 is divided into a plurality of beam spots by a diffraction grating 114. One of the plurality of beam spots is used as a beam spot for recording, and another beam spot is used as a beam spot for reproduction. Reflected light components obtained from these beam spots are independently detected by a detector 122. A period for which a recording laser beam is in an ON state is referred to as a gate signal, and a mask is put on an RF signal obtained from a beam spot for reproduction, thereby selectively detecting pits reproduced when the recording laser beam is in the ON state.

1 Claim, 23 Drawing Sheets

U.S. PATENT DOCUMENTS

2003/0067852 A1* 4/2003 Tsukihashi et al. ....... 369/44.38
2006/0023581 A1* 2/2006 Sunagawa et al. ........ 369/44.27

FOREIGN PATENT DOCUMENTS

| | | |
|---|---|---|
| EP | 0 589 670 A1 | 3/1994 |
| EP | 0698 880 A2 | 2/1996 |
| EP | 0 731 455 A2 | 9/1996 |
| JP | 51-109851 | 9/1976 |
| JP | 53-50707 | 9/1978 |
| JP | 1-287825 | 11/1989 |
| JP | 4-137224 | 5/1992 |
| JP | 5-143999 | 6/1993 |
| JP | 5-144001 | 6/1993 |
| JP | 7-129956 | 5/1995 |
| JP | 7-235056 | 9/1995 |
| JP | 9-147361 | 6/1997 |
| JP | 09147361 A * | 6/1997 |
| JP | 10-134352 | 5/1998 |
| JP | 2002-183963 | 6/2002 |
| JP | 2003-123254 | 4/2003 |
| JP | 2003-173532 | 6/2003 |
| JP | 2004-22044 | 1/2004 |

* cited by examiner

[Figure 1]
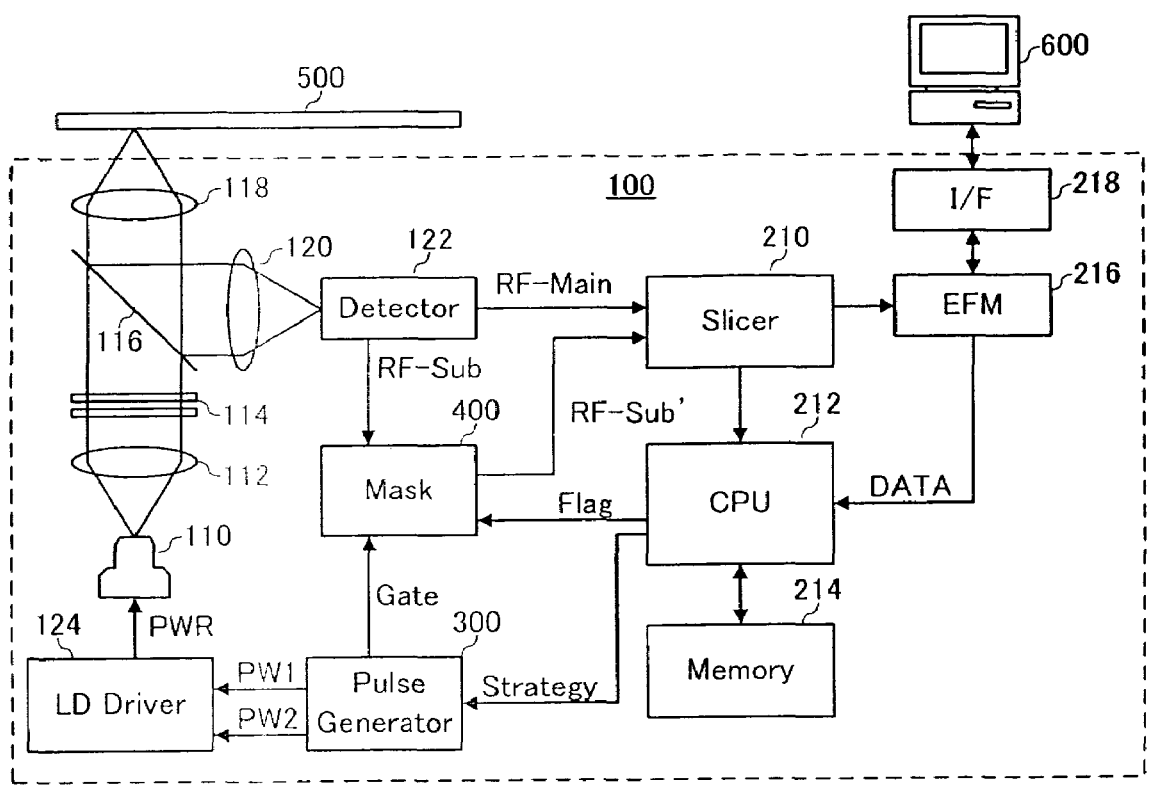

[Figure 2]
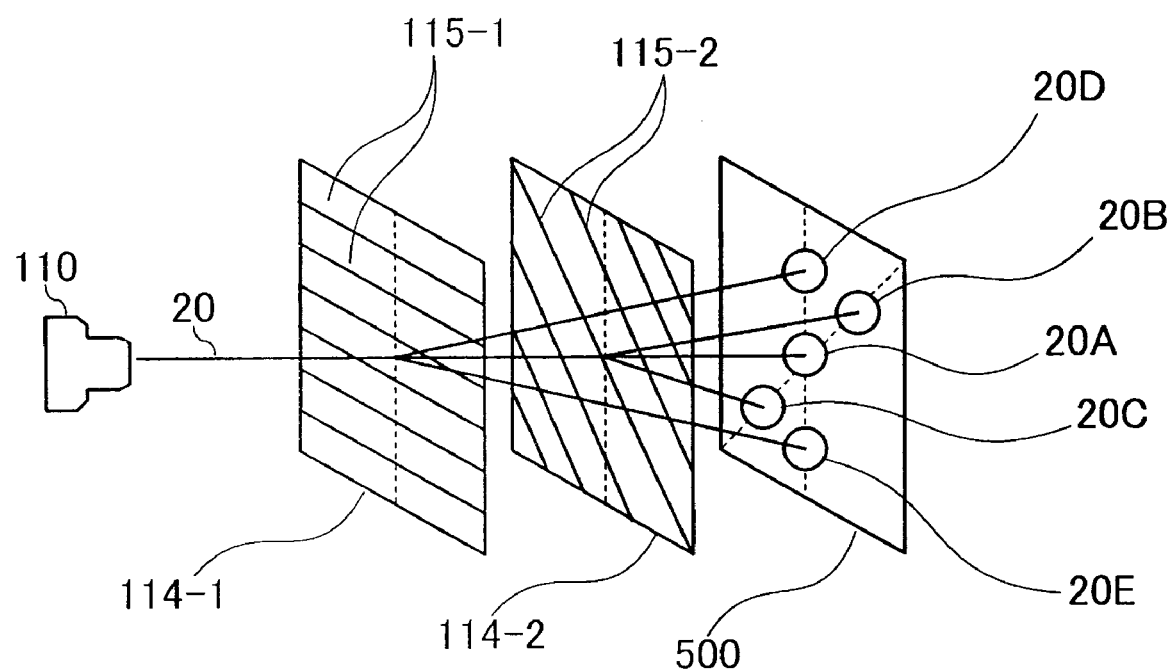

[Figure 3]
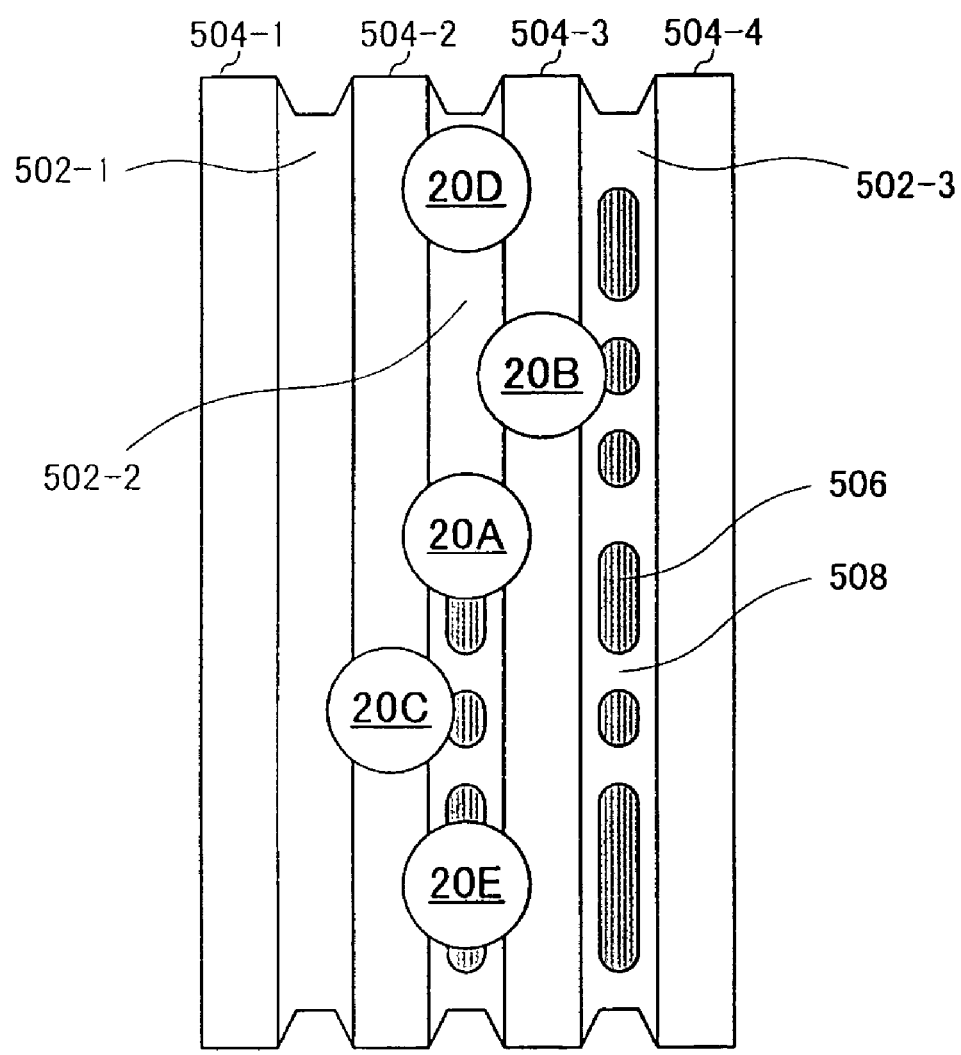

[Figure 4]
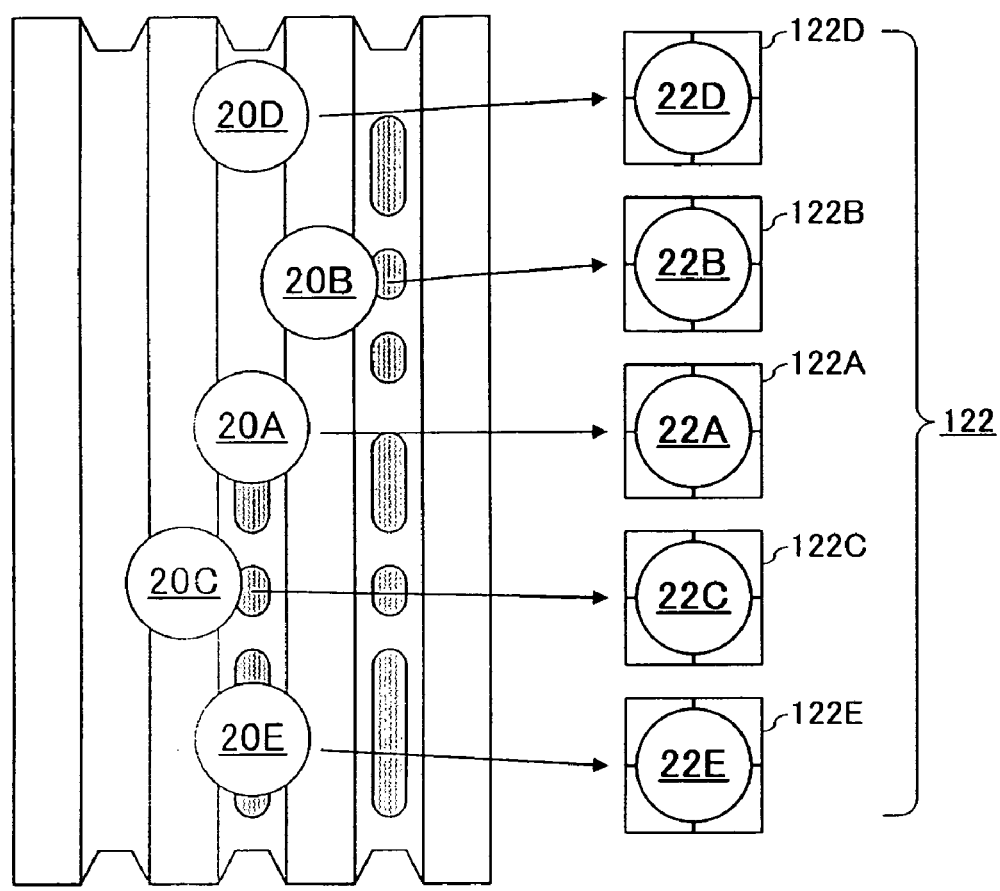

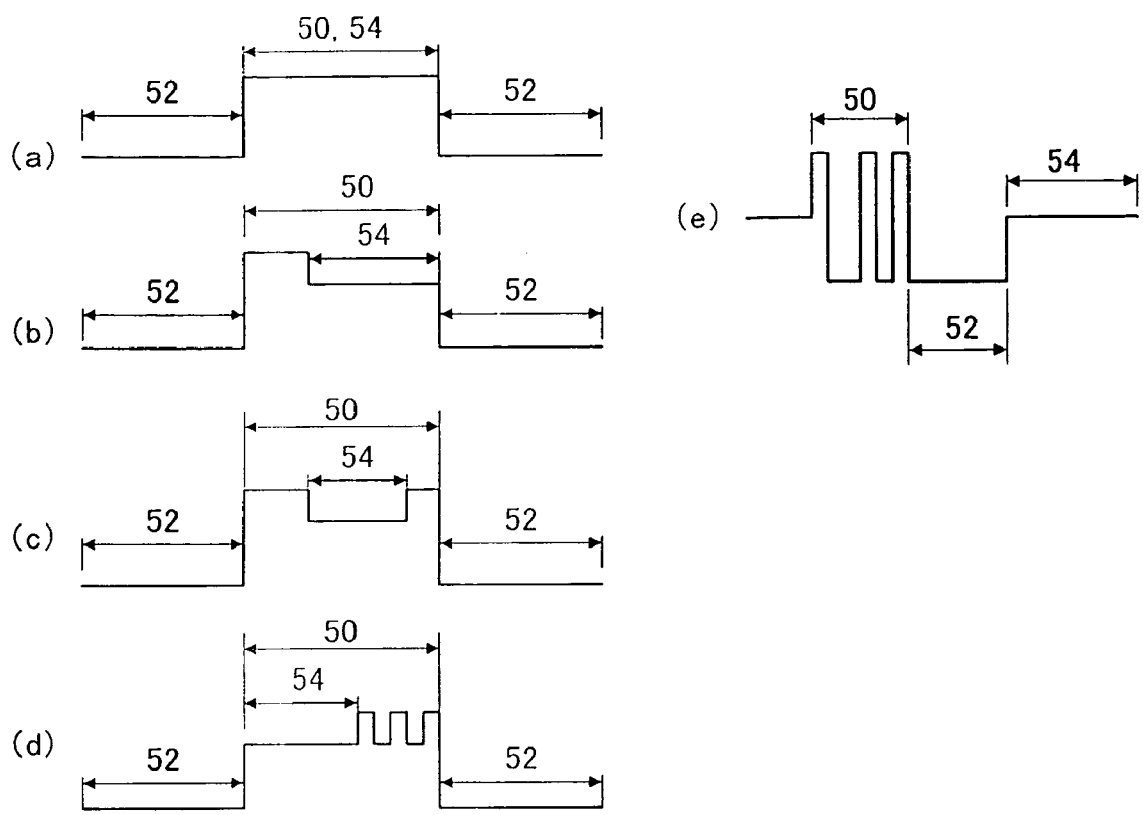
[Figure 5]

[Figure 6]
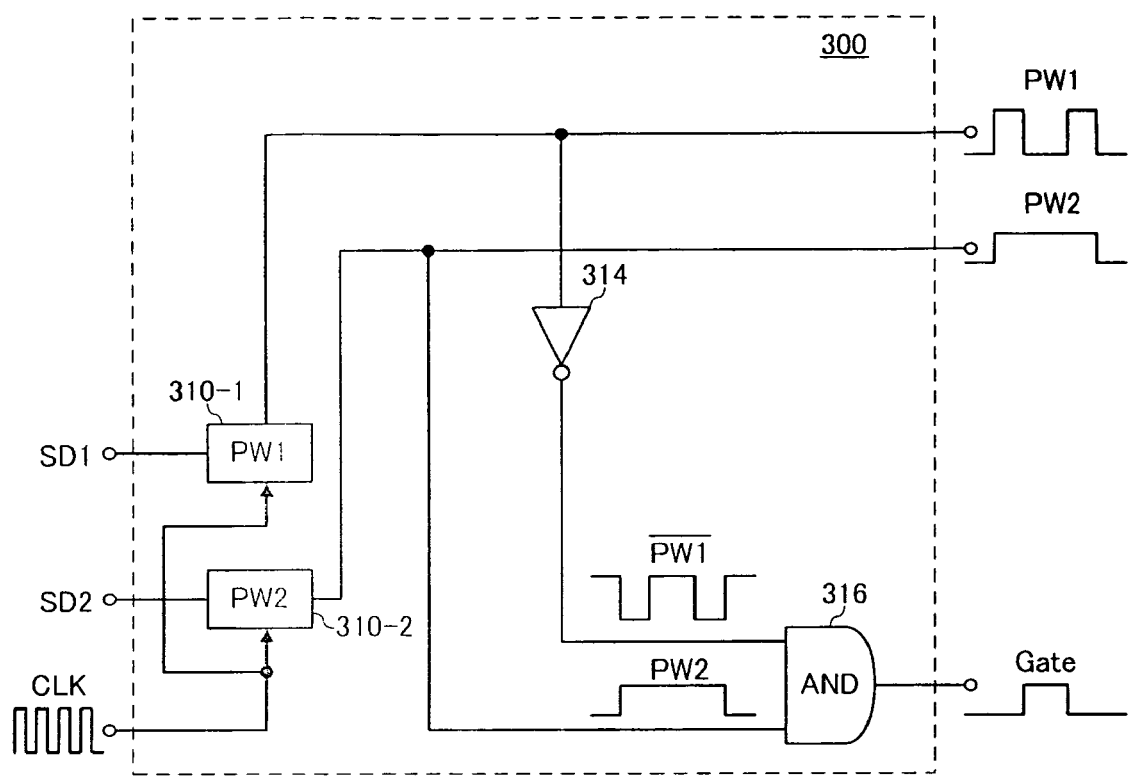

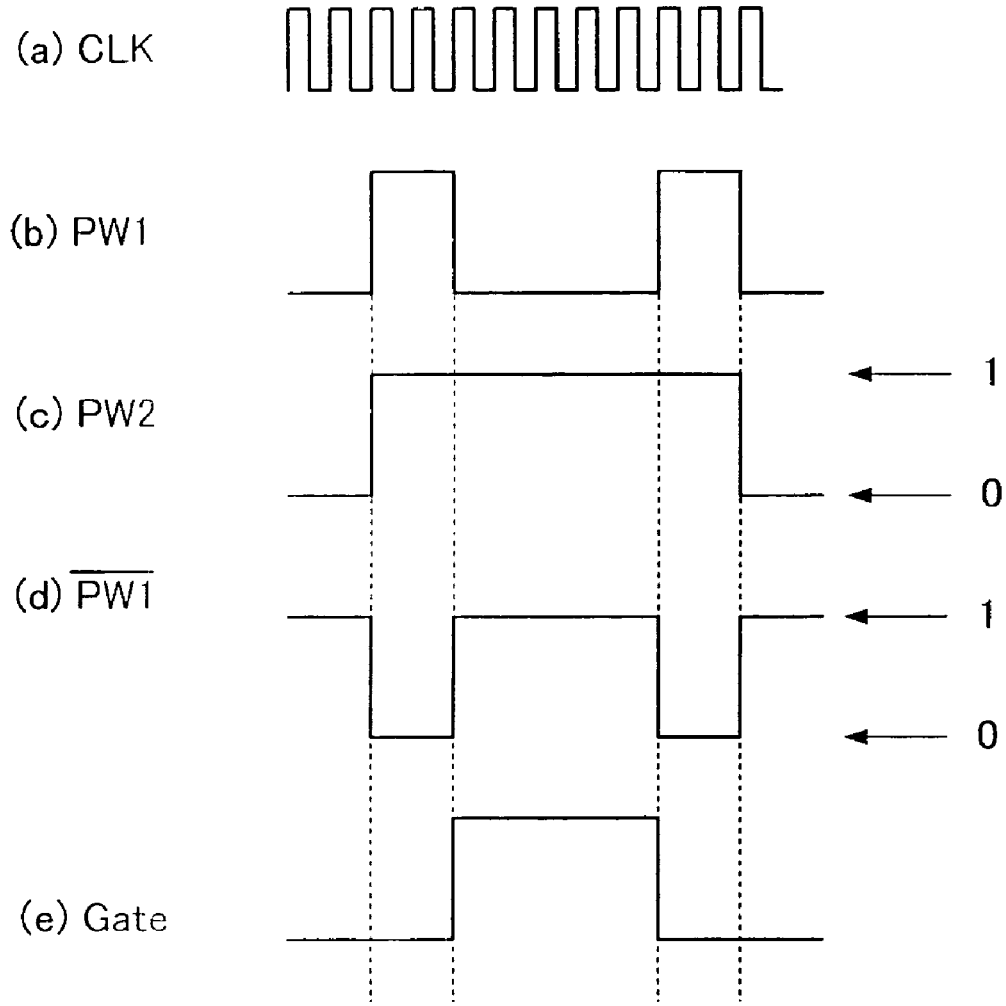

[Figure 8]
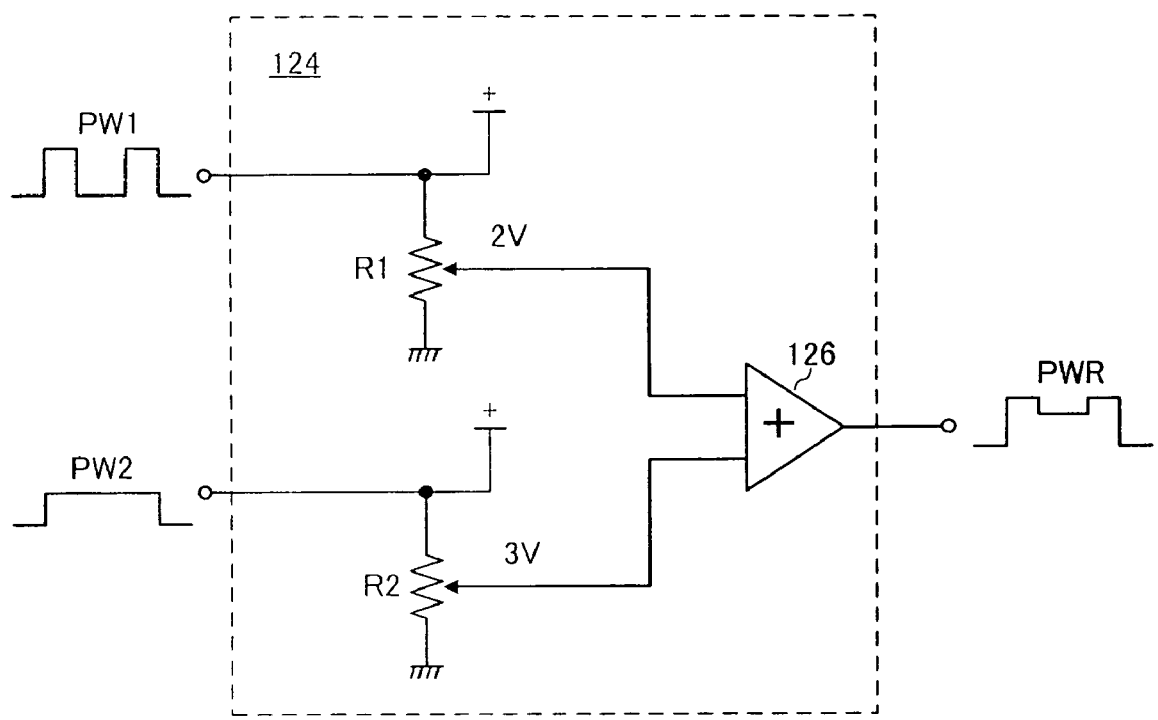

[Figure 9]
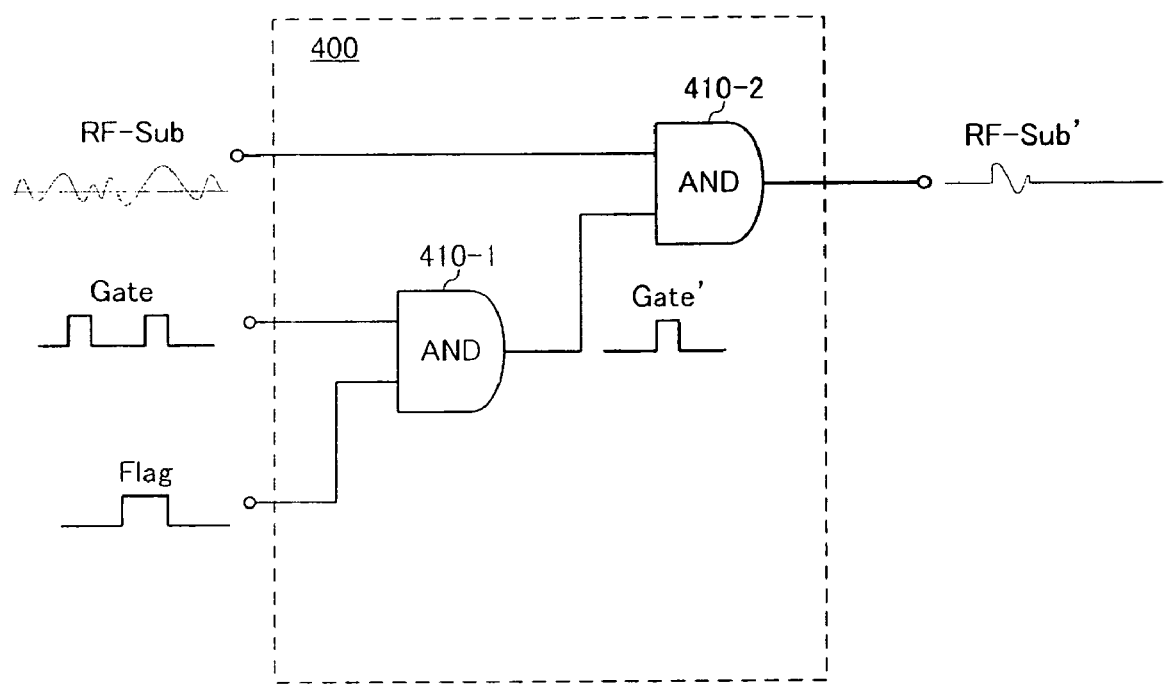

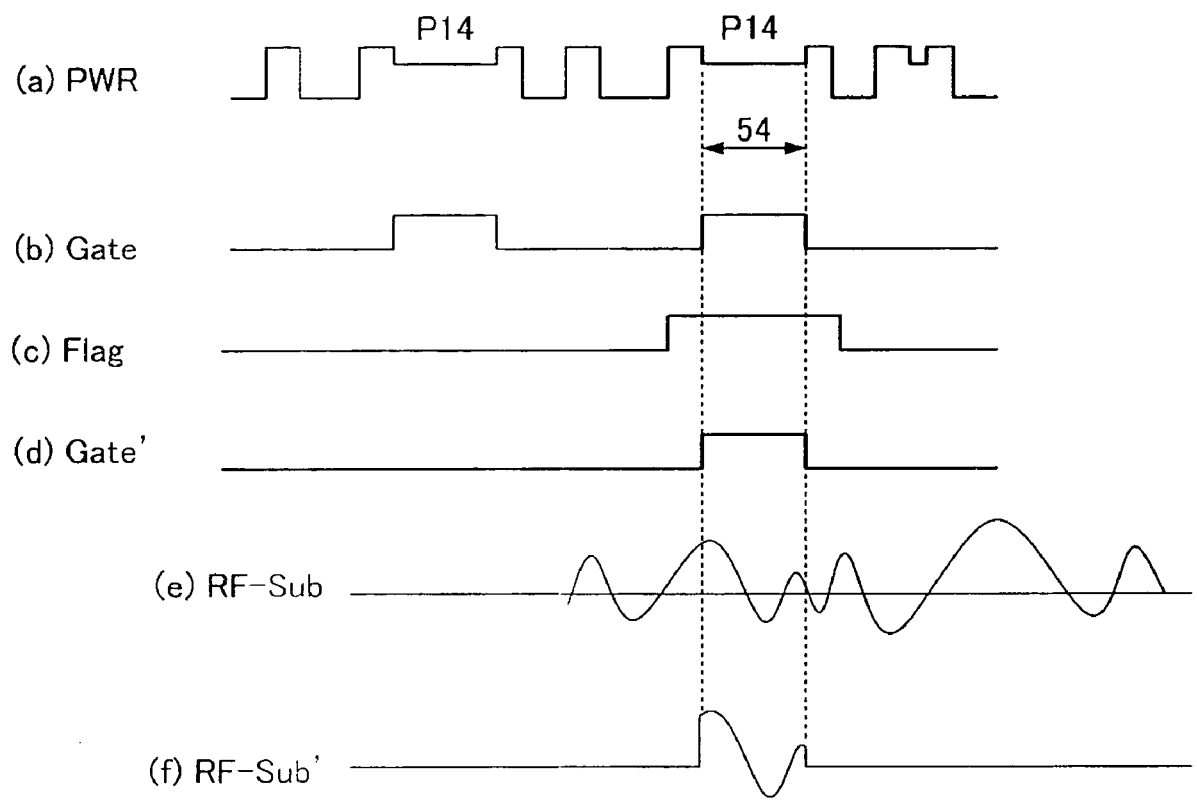
[Figure 10]

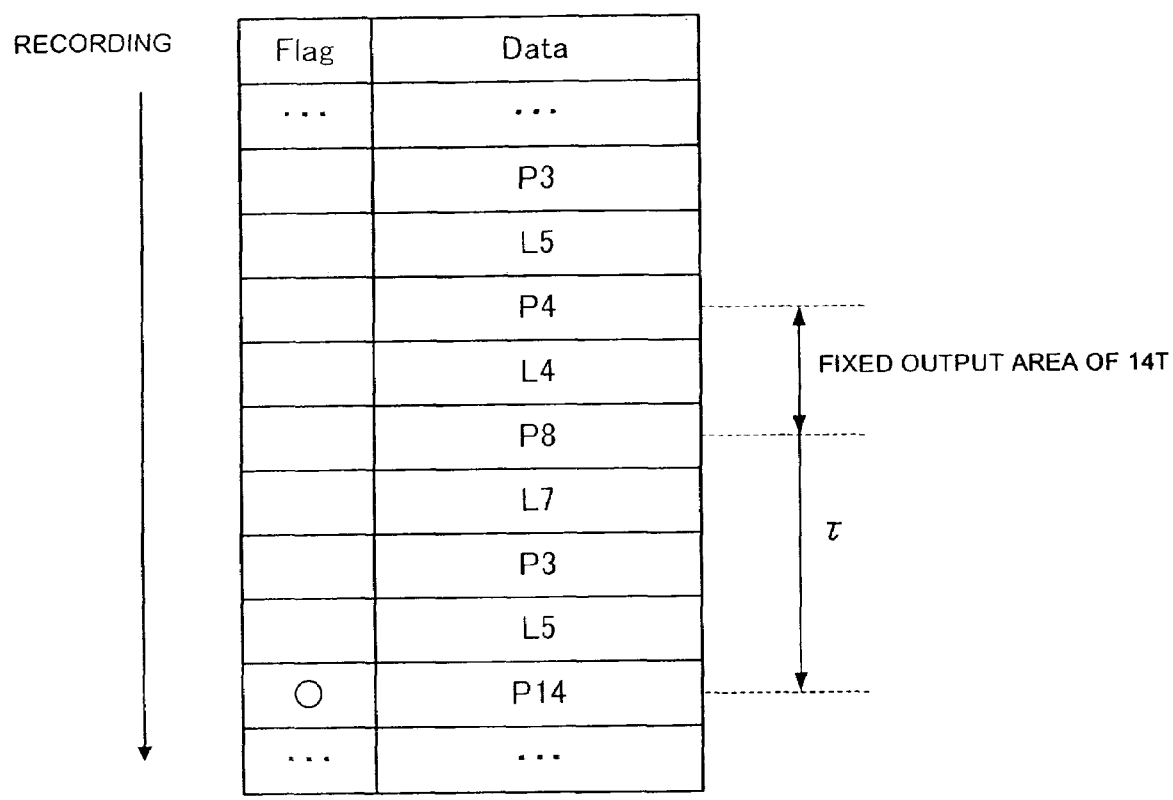
[Figure 11]

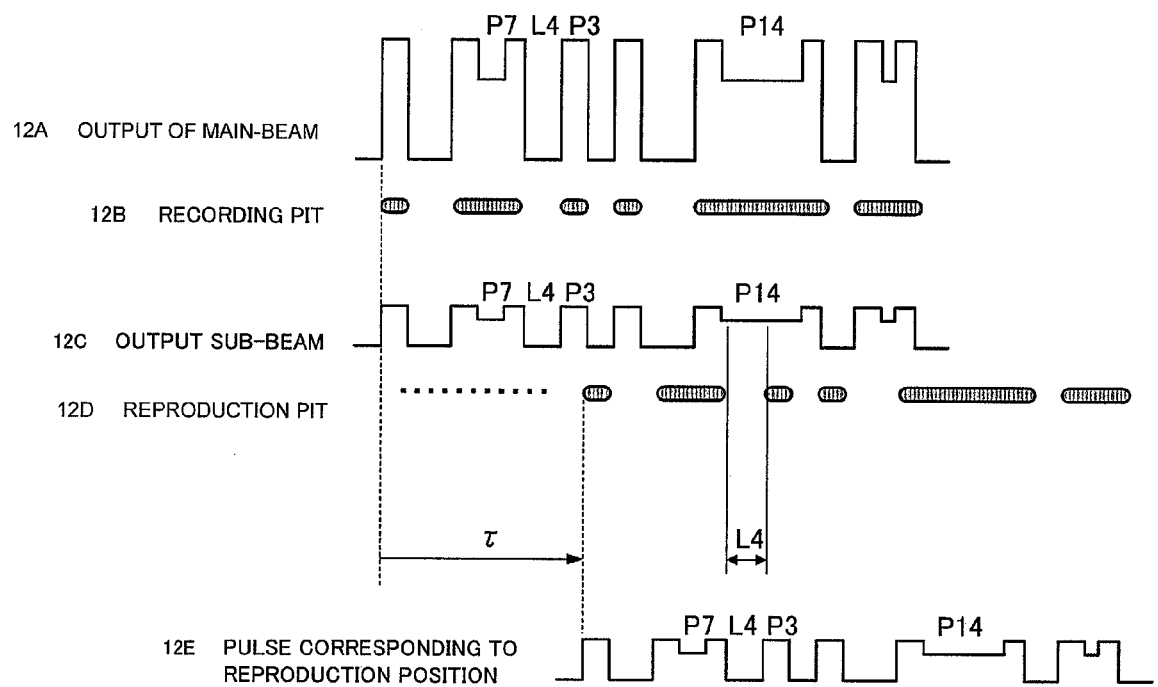

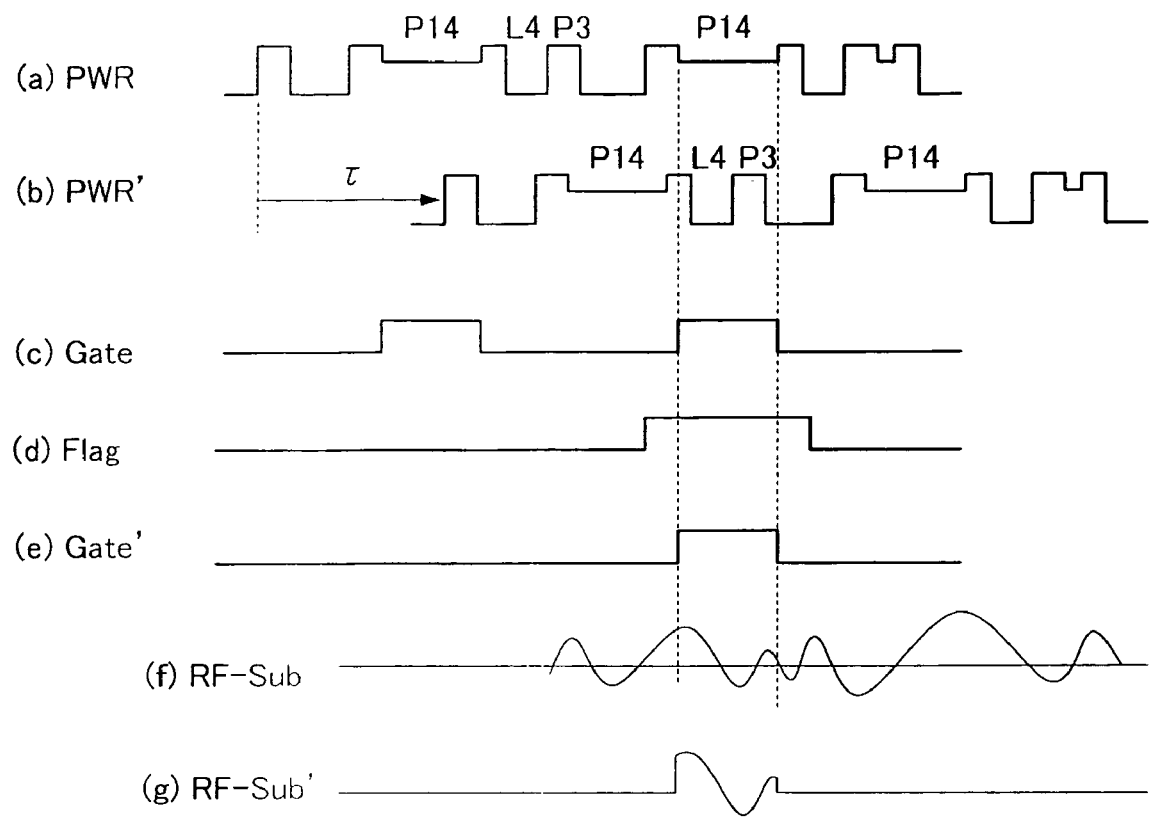
[Figure 13]

[Figure 14]
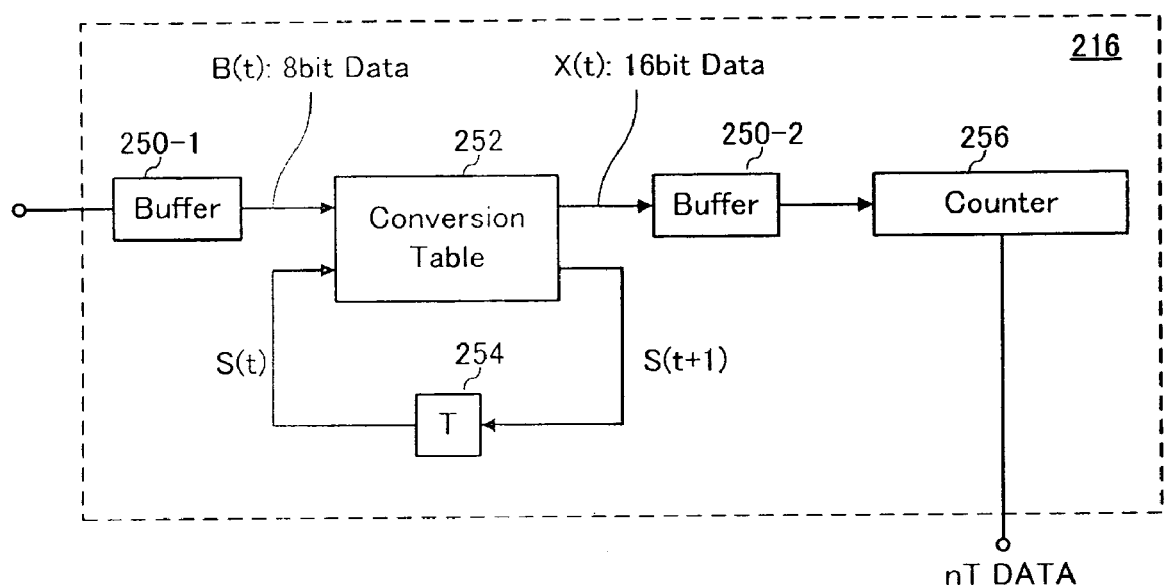

[Figure 1 5]
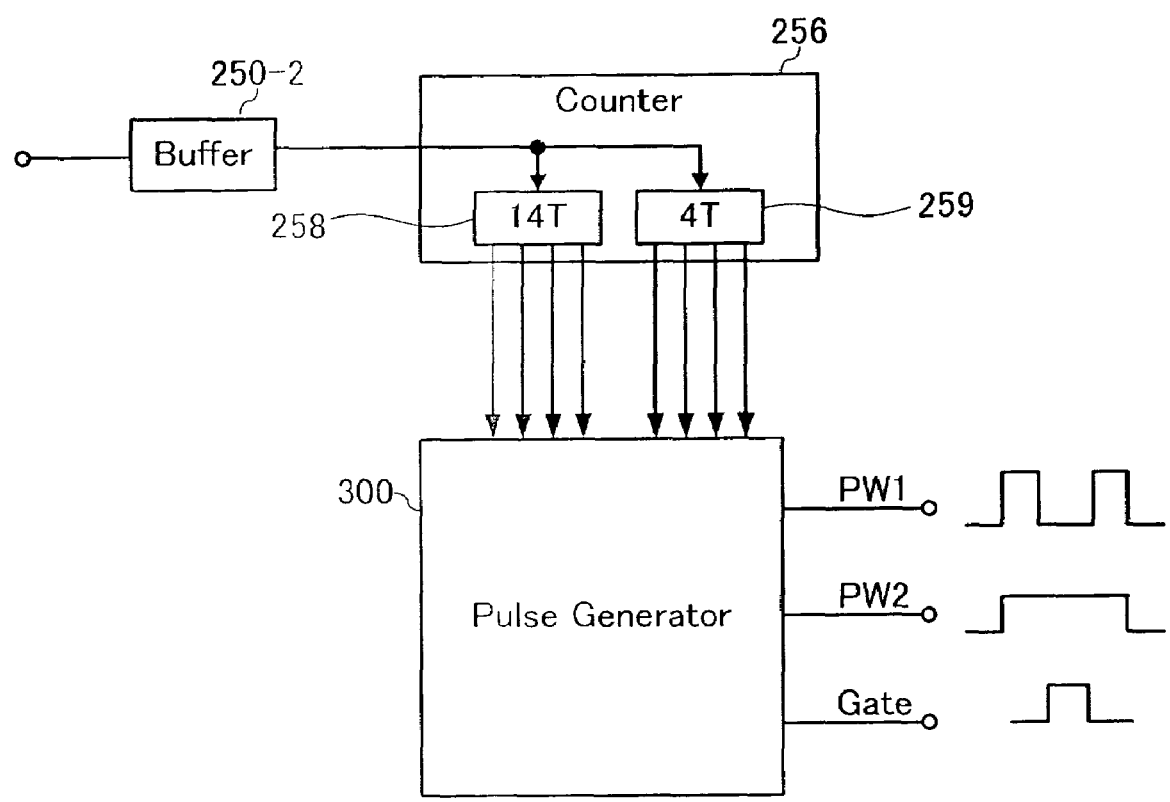

[Figure 1 6]
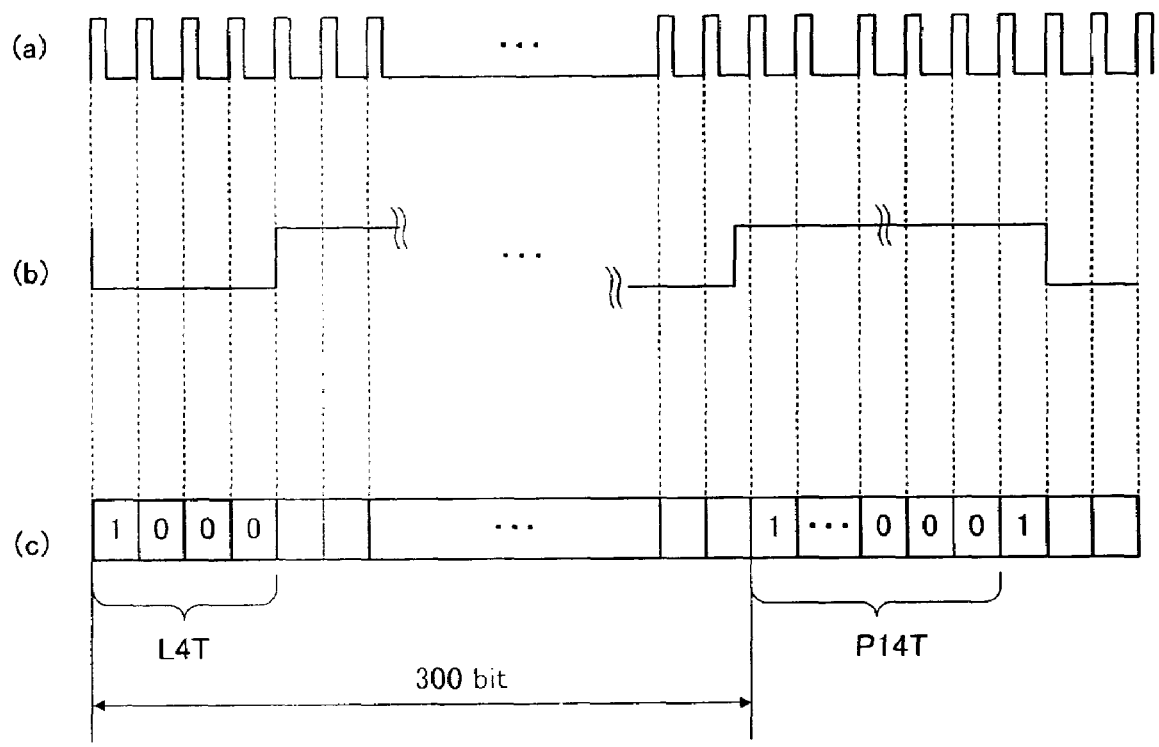

[Figure 17]
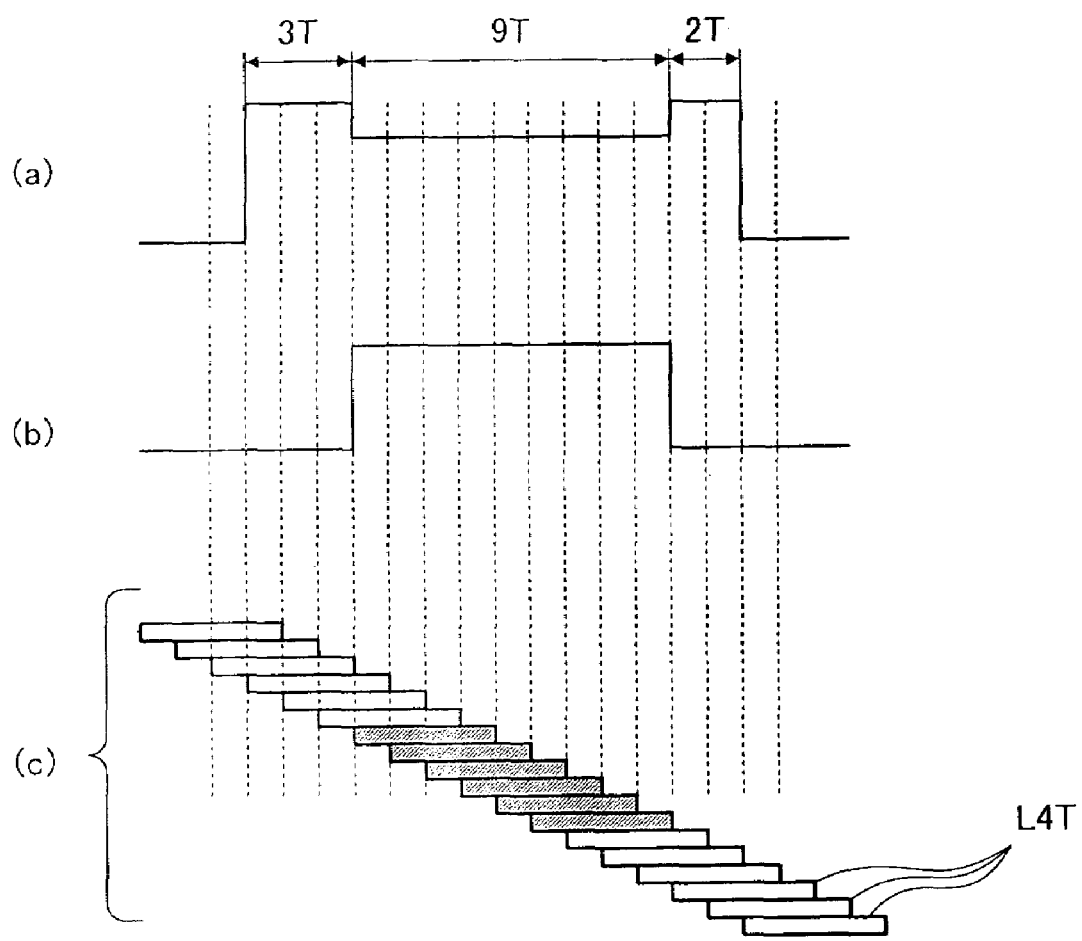

[Figure 1 8]
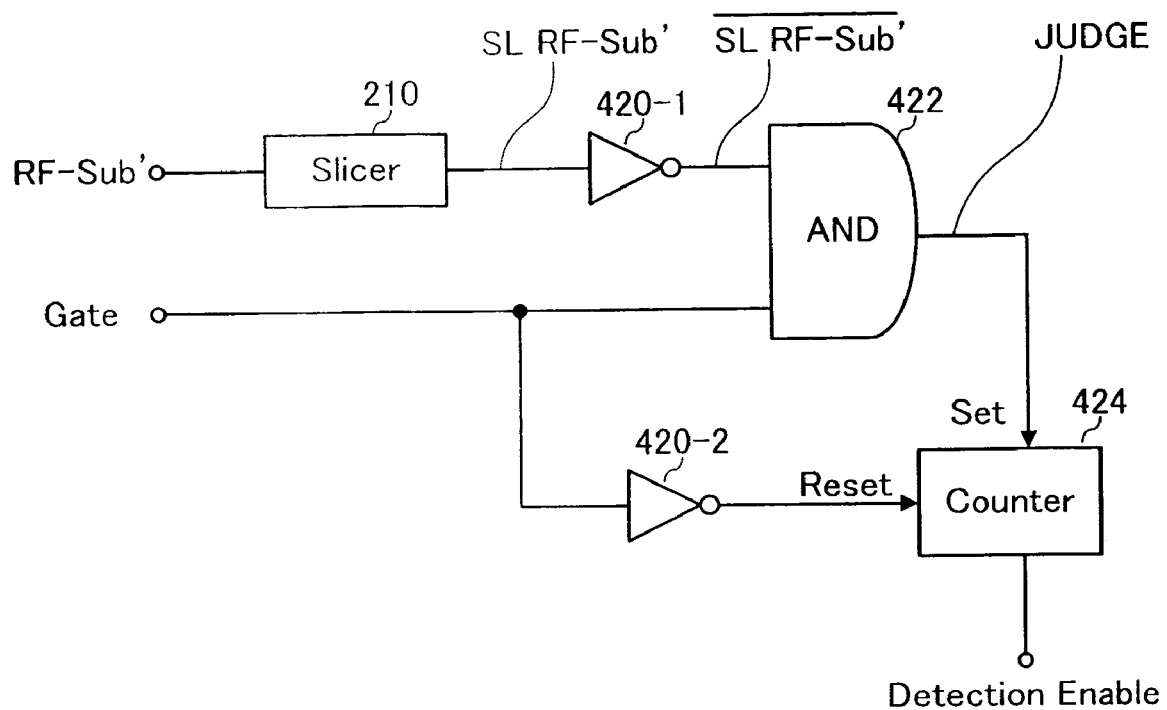

【Figure 19】
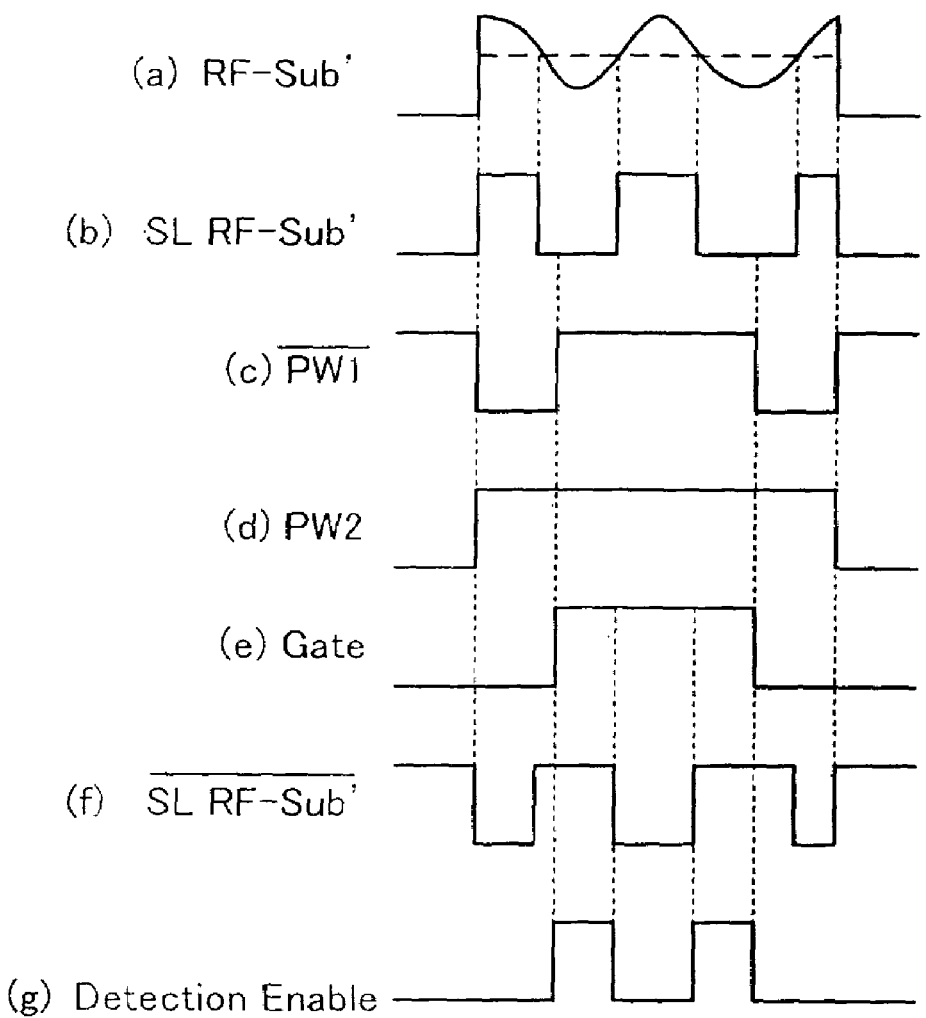

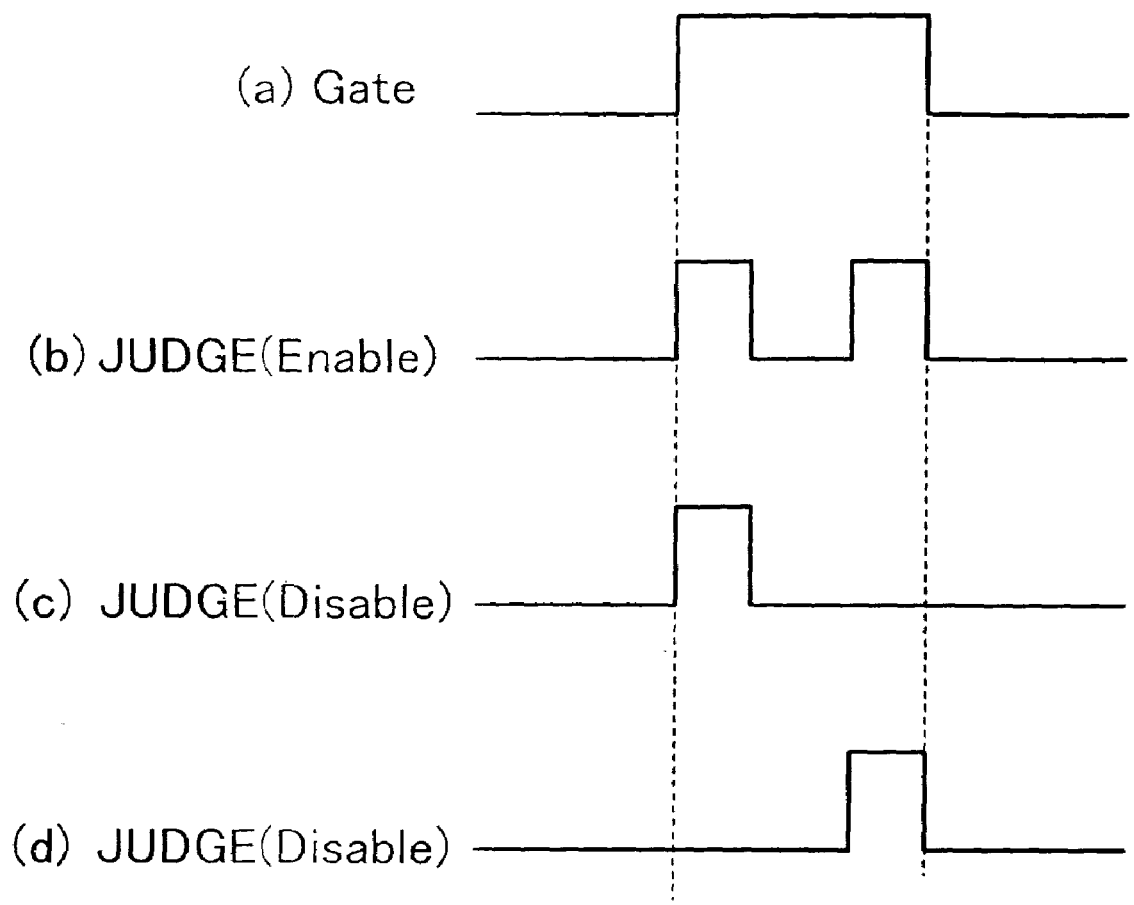
[Figure 20]

[Figure 2 1]
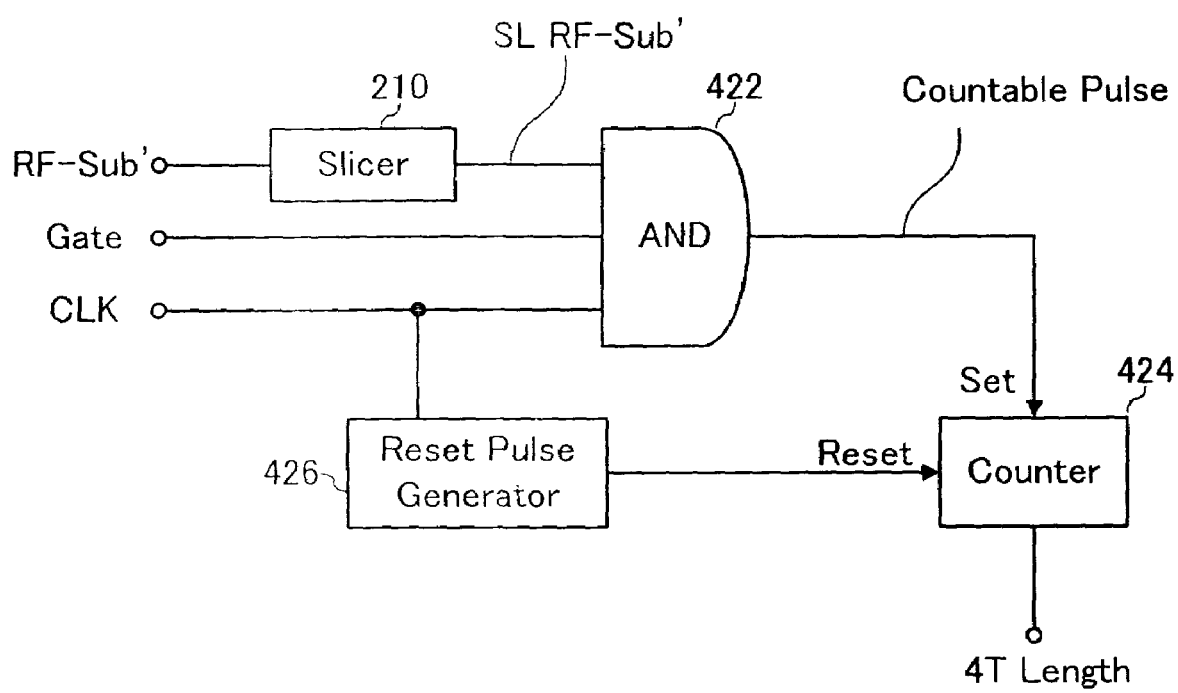

[Figure 2 2]
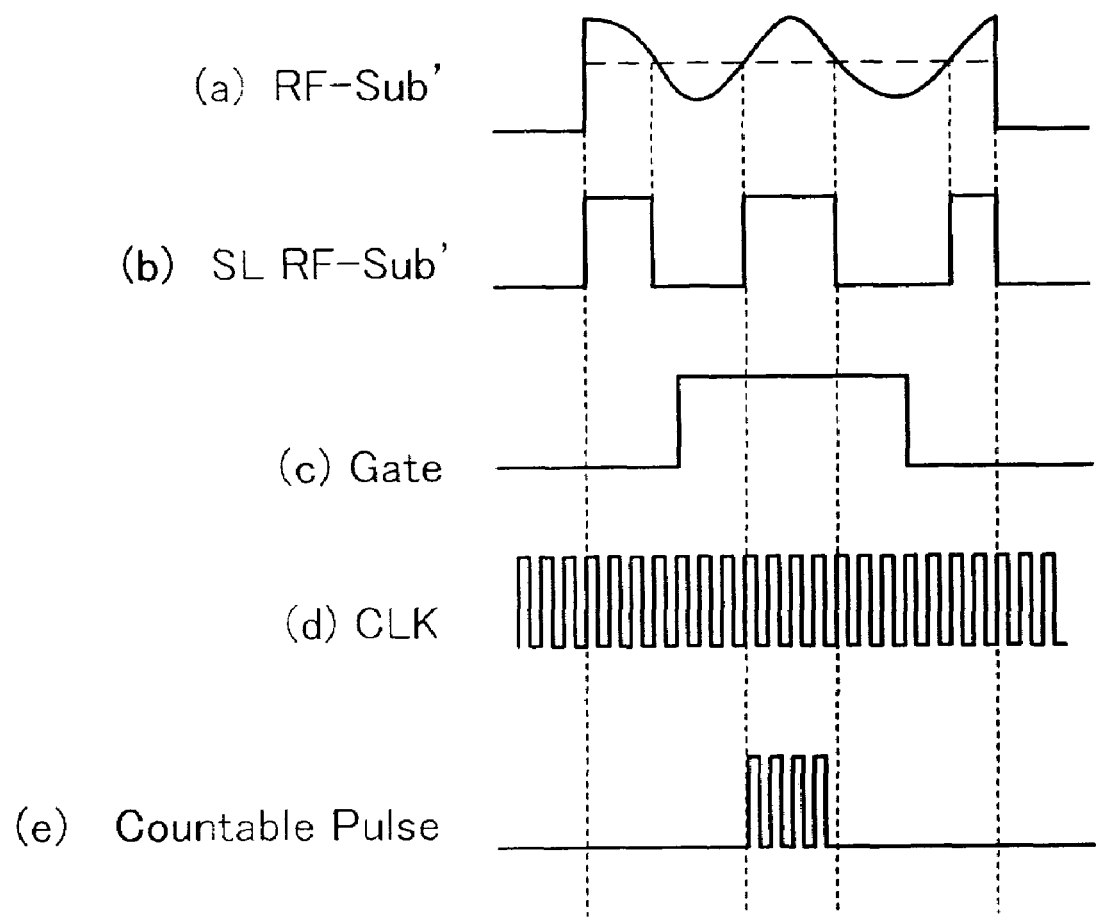

[Figure 2 3]
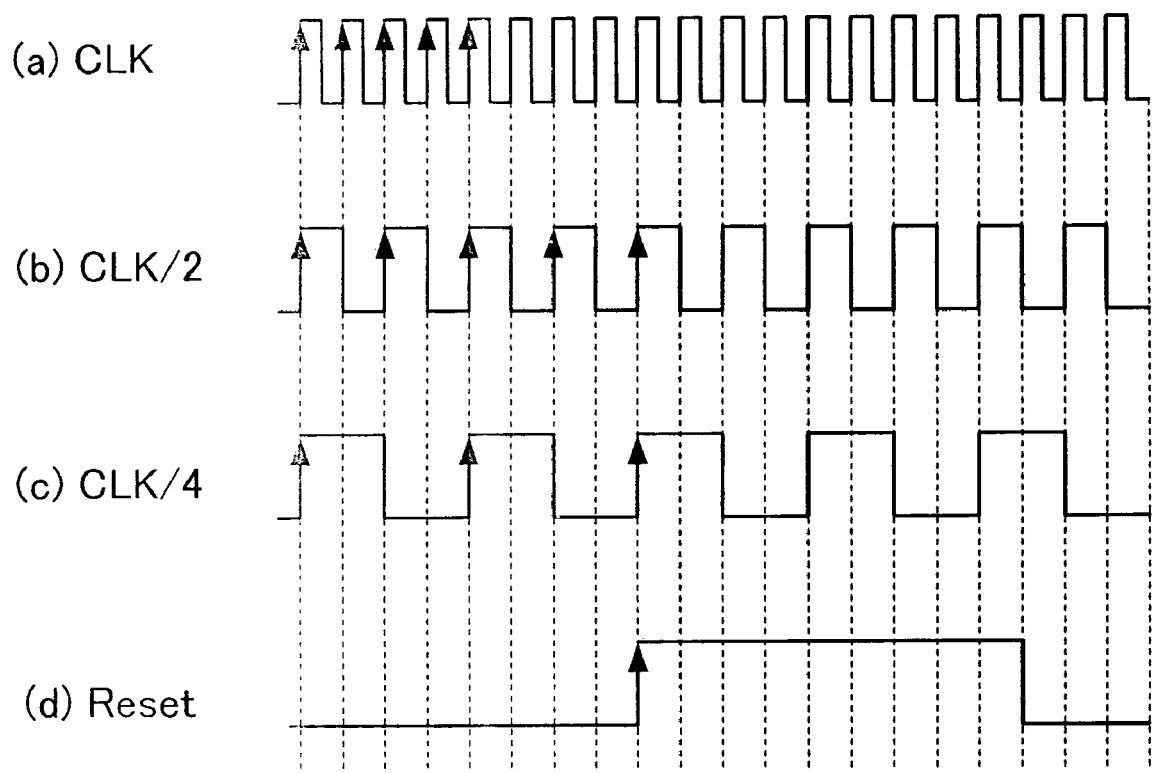

OPTICAL INFORMATION RECORDING DEVICE FOR DETECTING INFORMATION DURING RECORDING AND METHOD THEREFOR

CROSS-REFERENCE TO RELATED APPLICATIONS

This application is a continuation of U.S. application Ser. No. 11/158,593, filed Jun. 22, 2005 now abandoned.

BACKGROUND OF THE INVENTION

1. Field of the Invention

The present invention relates to an optical information recording device, and more particularly, to an optical information recording device capable of correcting recording conditions in real time.

2. Description of the Related Art

In general, the recording of information on an optical information recording medium, such as an optical disk, is carried out as follows: record data is modulated in an EFM (Eight to Fourteen Modulation) manner or eight-to-sixteen modulation manner; a recording pulse is formed based on this modulation signal; and the intensity or irradiation timing of a laser beam is controlled based on this recording pulse, thereby forming recording pits on the optical disk.

In this manner, since the recording pits are formed by using heat generated by the irradiation of the laser beam, it is necessary to set the recording pulse in consideration of a heat accumulation effect or thermal interference. Therefore, in the related art, various parameters constituting the recording pulse are set in plural strategy formats for every kind of optical disk, and a strategy the most suitable for the recording conditions is selected from the plural strategies, thereby recording information on the optical disk.

This strategy depends not only on an individual device differences in optical information recording devices, such as a variation in the spot diameter of a pick-up device or a variation in the precision of a mechanism, but also on manufacturers of optical disks used for recording reproduction and the recording speed. Therefore, setting the optimal strategy is to improve recording quality.

Therefore, there has been proposed a method in which the strategies the most suitable for various optical disks manufactured by different companies are calculated, these strategies are previously stored in a memory so as to correspond to the respective manufacturing companies, the manufacturing company recorded on the optical disk is read when information is recorded on the optical disk, and the strategy the most suitable for the read manufacturing company is read out from the memory.

However, according to the above-mentioned method, the optimal recording can be performed on the optical disks of the manufacturing companies previously stored in the memory, but cannot be performed on optical disks of manufacturing companies that are not stored in the memory. In addition, when the optical disks of the manufacturing companies previously stored in the memory are different from each other in recording speed, the optimal recording cannot be performed.

Therefore, a method in which test recording is previously performed for every recording condition, and in which the optimal strategy is determined, based on this test recording, which makes it possible to cope with various optical disks, has been disclosed in the following related arts: JP-A Nos. 5-144001, 4-137224, 5-143999, and 7-235056. However, in the method disclosed therein, the test recording has to be preformed before information recording starts. Therefore, it is not possible to perform strategy correction at the same time as recording, and thus it is difficult to cope with a case in which the optimal conditions of the inner and outer circumferences of an optical disk are different from each other.

As a result, that is, an inner circumferential portion of an optical disk may be slightly different from an outer circumferential portion thereof in recording characteristics, and the recording speed of the inner circumferential portion may be different from that of the outer circumferential portion in a recording apparatus. Therefore, a difference in recording quality between the inner circumferential portion and the outer circumferential portion can occur. Thus, in order to solve the above-mentioned problem, a technique of reducing the difference in recording quality between the inner circumferential portion and the outer circumferential portion by adjusting the output of a laser has been disclosed in JP-A No. 53-050707. The above-mentioned related art also discloses a technique of automatically performing the optimization of the output of a laser by detecting a variation in the amount of light of an auxiliary beam, which is called OPC.

In the above-mentioned OPC, since a unit for adjusting power is provided, it is possible to calculate correction conditions using a statistical index, such as an asymmetric value, which makes it possible to perform real time correction in which correction is simultaneously performed with recording. However, when the width or phase condition of a pulse is corrected, it is necessary to detect the amount of deviation between a recording pulse and a pit formed on an optical disk. Thus, in the above-mentioned OPC, it is difficult to cope with the case in which the optimal conditions of the inner and outer circumferential portions of an optical disk are different from each other.

Therefore, in order to correct the pulse conditions in real time, it is necessary to detect the position or length of a pit at the same time when recording is performed. As an approach to cope with this, a technique of reproducing substantially the same place as a recording place has been disclosed in JP-A No. 51-109851. However, this technique is applicable to magneto-optical recording, but is hardly applicable to optical recording not using magnetism. That is, in the magneto-optical recording, since information is recorded by the variation of magnetism, the output of a laser is not modulated. However, in the optical recording, since information is recorded by modulating the output of a laser, there is a problem in that the modulation has an effect on a reproduction side.

Techniques to solve this problem have been disclosed in JP-A Nos. 1-287825, 7-129956, 2004-22044, and 9-147361. JP-A No. 1-287825 discloses a technique of separately irradiating laser beams to a non-recording area and a recording area, and of acquiring reproduction signals by performing division between the respective signals obtained by the irradiation. According to this technique, it is possible to correct the distortion of a reproduction signal waveform by modulating the intensity of a laser beam when information is recorded.

Further, JP-A No. 7-129956 discloses a technique of obtaining reproduction signals by canceling out a modulated output by a reverse-phase clock and a laser output properly amplified by auto gain control (AGC).

Furthermore, JP-A No. 2004-22044 discloses a technique of canceling out the distortion of a reproduction signal due to the waveform variation of a recording pulse by creating a signal corresponding to the waveform variation of the recording pulse using a delay inversion equivalent circuit.

Moreover, according to the techniques disclosed in the above-mentioned JP-A Nos. 1-287825, 7-129956, and 2004-22044, modulation components can be cancelled out by calculation in theory. However, these techniques have various problems in practical use from the viewpoint of the precision of cancellation or the speed of calculation.

Further, JP-A No. 9-147361 discloses a technique of detecting, in real time, the deviation of a recording state by inputting a delay pulse obtained by delaying a recording pulse, a gate signal obtained by inverting a modulated signal, and a reproduction pulse into a phase comparator.

However, according to the technique disclosed in the above-mentioned JP-A No. 9-147361, pits are reproduced when the recording laser is in a low outputstate. Therefore, when the output of a sub-beam is low, it is difficult to obtain a superior reproduction signal. In particular, in a structure in which sub-beams for reproduction are generated by branching a main beam for recording, when a branching ratio is 20:1 or 30:1, there is a problem in that the sub-beam does not have a sufficient output.

That is, in JP-A No. 9-147361, the branching ratio is set to 8:1, but the branching ratio tends to increase with an increase in the speed of recording. In addition, the output of the beam is generally 1 mW or lower when the recording laser is in the low output state. Therefore, the intensity of light reflected from a recording surface detectable when the recording laser is in the low output state becomes extremely weak. When the intensity of detectable light is weak, the light can be easily affected by a circuit noise, a media noise, etc. As a result, a superior detection signal is not obtained.

SUMMARY OF THE INVENTION

Therefore, it is an object of the invention to provide a method effective in detecting a reproduction signal in real time correction in which correction is simultaneously performed with recording.

In order to achieve the above-mentioned object, according to a first aspect of the invention, an optical information recording device forms pits on an optical recording medium by pulse irradiation of a recording laser beam onto the optical recording medium, and detects the pits by irradiating a reproduction laser beam onto the optical recording medium. In the optical information recording device, the pulse irradiation of the recording laser beam is performed based on a recording pulse having at least two output areas, a high output segment (referred to herein as an ON state) and a low output segment (referred to herein as an OFF state), and the detection of the pits is performed within a period during which the recording laser beam is irradiated in the high output segment.

As such, even if the reproduction laser beam is generated by the division of the recording laser beam, it is possible to secure the output of the reproduction laser beam by performing the detection of a pit in the high output segment of the recording laser beam. In particular, the first aspect of the invention is effective when a branching ratio of the recording laser beam and the reproduction laser beam is large and when it is difficult to supply a sufficient output to the reproduction laser beam.

That is, since a laser beam having higher light-emitting intensity is output when pits are recorded rather than when normal reproduction is performed, it is possible to detect a reproduction signal having relatively small amount of noise with high precision by extracting the high output conditions selectively to fetch the reproduction signal.

It is possible to cope with a difference in recording quality between the inner and outer circumferential portions of an optical disk by correcting recording conditions in real time, based on the pit information detected in this way. In addition, the invention includes a technique of optimizing strategy by reading out a short pit while a pit longer than a detection target is recorded and a technique of directly reading out information immediately after recording without suspending a recording operation to detect the deviation of a recording signal and of correcting strategy based on the detected deviation.

Further, according to a second aspect of the invention, an optical information recording device forms pits on an optical recording medium by pulse irradiation of a recording laser beam onto the optical recording medium, and detects the pits by irradiating a reproduction laser beam onto the optical recording medium. In the optical information recording device, the pulse irradiation of the recording laser beam is performed based on a recording pulse having at least two output areas, a high output segment and a low output segment, and the pulse irradiation of the reproduction laser beam is performed at a timing synchronized with the pulse irradiation of the recording laser beam. In addition, the detection of the pits is performed in the high output segment of the reproduction laser beam.

In this way, it is possible to perform high-precision signal detection by synchronizing the reproduction laser beam with the recording laser beam and by detecting the pits in the high output segment of the reproduction laser beam. In addition, aspects of synchronism include the branch of a laser beam by diffraction, the irradiation of two laser beams, and the driving of twin lasers.

Furthermore, according to a third aspect of the invention, an optical information recording device forms pits on an optical recording medium by pulse irradiation of a recording laser beam onto the optical recording medium, and detects the pits by irradiating a reproduction laser beam onto the optical recording medium. In the optical information recording device, the pulse irradiation of the recording laser beam is performed based on a recording pulse having at least two output areas, a high output segment and a low output segment, and the high output segment has a constant output portion in which the level of the recording pulse is fixed. In addition, the detection of the pits is performed within a period for which the recording laser beam is irradiated onto the constant output portion.

Here, the term 'constant output portion' means an area in which the recording pulse is in an ON state and stable modulation with less modulation is performed, and preferably an area in which a non-modulation state is maintained longer than a predetermined time. More specifically, it is preferable to use a constant output portion of 14T or 11T having a longer high output segment of the recording pulse.

As such, it is possible to avoid being affected by modulation by carrying out pit detection of the recording pulse in the constant output portion. That is, even if the same light source is used for recording and reproduction, it is possible to perform the detection of a pit, based on the laser beams having a high output and a fixed output, by selectively using a stable non-modulation area in which the recording pulse does not vary steeply. As a result, it is possible to obtain a high-precision signal. Moreover, according to a fourth aspect of the invention, an optical information recording device forms pits on an optical recording medium by pulse irradiation of a recording laser beam onto the optical recording medium, and detects the pits by irradiating a reproduction laser beam onto the optical recording medium. In the optical information recording device, the pulse irradiation of the recording laser beam is performed based on a recording pulse having at least two output areas, a high output segment and a low output segment, and the high output segment has a constant output portion in which the level of the recording pulse is fixed. In addition, the pulse irradiation of the reproduction laser beam is performed at a timing synchronized with the pulse irradiation of the recording laser beam, and the detection of the pits is performed in the constant output portion of the reproduction laser beam.

As such, it is possible to detect signals with high precision by synchronizing the reproduction laser beam with the recording laser beam and by detecting the pits in the constant output portion of the reproduction laser beam.

Furthermore, according to a fifth aspect of the invention, an optical information recording device forms pits on an optical recording medium by pulse irradiation of a recording laser beam onto the optical recording medium, and detects the pits by irradiating a reproduction laser beam onto the optical recording medium, wherein the recording laser beam and the reproduction laser beam are obtained by branching a laser beam. The optical information recording device includes a pulse generating unit that generates a recording pulse having at least two output areas, a high output segment and a low output segment and a mask unit that puts a mask on a reproduction signal obtained by irradiating the reproduction laser beam, using the high output segment of the recording pulse.

As such, it is possible to selectively extract signals reproduced by a high-output laser beam by masking the reproduction signal in the high output segment of the recording pulse. In addition, the masking method includes a method of masking an RF signal obtained by the reproduction laser beam and a method of masking a binary reproduction signal.

Moreover, according to a sixth aspect of the invention, an optical information recording device forms pits on an optical recording medium by pulse irradiation of a recording laser beam onto the optical recording medium, and detects the pits by irradiating a reproduction laser beam onto the optical recording medium, wherein the recording laser beam and the reproduction laser beam are obtained by branching a laser beam. The optical information recording device includes a pulse generating unit that generates a recording pulse having at least two output areas, a high output segment and a low output segment; a unit that specifies a constant output portion, in which the level of the recording pulse is fixed, out of the high output segment; and a mask unit that puts a mask on a reproduction signal obtained by irradiating the reproduction laser beam, using the constant output portion of the recording pulse.

As such, it is possible to selectively extract a signal reproduced by the laser beam having a stable high output by masking the reproduction signal in the constant output portion of the recording pulse.

Further, according to a seventh aspect of the invention, an optical information recording device forms pits on an optical recording medium by pulse irradiation of a recording laser beam onto the optical recording medium, and detects the pits by irradiating a reproduction laser beam onto the optical recording medium, wherein the recording laser beam and the reproduction laser beam are obtained by branching a laser beam. The optical information recording device includes a pulse generating unit that generates a recording pulse having at least two output areas, a high output segment and a low output segment; a gate signal generating unit that generates a gate signal using the high output segment of the recording pulse; a unit that specifies a time difference between the recording laser beam and the reproduction laser beam; a unit that specifies a detection target pulse having a length shorter than the gate signal; and a pit detecting unit that acquires a reproduction signal obtained by irradiating the reproduction laser beam at the timing when the detection target pulse is included in the gate signal in consideration of the time difference.

As such, it is possible to more reliably detect pits by selectively detecting a pit having a length shorter than the gate signal. That is, when a long pit is recorded, the high-output state of a laser beam is maintained longer than when a short pit is recorded. Therefore, it is possible to reliably acquire information on the length or phase of a pit by selectively detecting the recording pit having a recording time shorter than the light-emitting time of the recording laser beam, using the reproduction laser beam, within the light-emitting time. In addition, the gate signal can be used as follows.

A gate signal corresponding to a recording pulse of a pit having a length longer than a detection target is prepared, and the gate signal is compared to a detection signal of a beam spot for detecting reproduction to selectively extract only a reproduction signal during the recording of a long pit.

In addition, a gate signal corresponding to a recording pulse of a pit having a length relatively longer than a detection target is prepared, and the gate signal is compared to a detection signal of a beam spot for detecting reproduction to selectively extract only a recording pulse of a long pit.

Furthermore, according to an eighth aspect of the invention, an optical information recording device forms pits on an optical recording medium by pulse irradiation of a recording laser beam onto the optical recording medium, and detects the pits by irradiating a reproduction laser beam onto the optical recording medium, wherein the recording laser beam and the reproduction laser beam are obtained by branching a laser beam. The optical information recording device includes a pulse generating unit that generates a recording pulse by calculating the logical sum of a first pulse and a second pulse; a unit that pulse irradiates the recording laser beam, based on the recording pulse; a gate pulse generating unit that generates a gate pulse by calculating the logical multiplication of the second pulse and an inversion signal of the first pulse; and a pit detecting unit that acquires a reproduction signal obtained by irradiating the reproduction laser beam, based on the gate pulse.

As such, the gate pulse for masking the reproduction signal is generated by using a pulse component for driving the recording laser beam. Thus, it is possible to improve the generation efficiency of a gate signal.

BRIEF DESCRIPTION OF THE DRAWINGS

FIG. 1 is a block diagram illustrating the internal structure of a drive according to the invention;

FIG. 2 is an exploded perspective view illustrating the structure of a pick-up unit incorporated into the drive shown in FIG. 1;

FIG. 3 is a plan view illustrating the positions of spots irradiated onto an optical disk;

FIG. 4 is a conceptual view illustrating the relationships between a detector and the spots irradiated onto the optical disk;

FIGS. 5A to 5E are conceptual views illustrating the relationships between the shape of a recording pulse and a stable area;

FIG. 6 is a circuit block diagram illustrating the internal structure of a pulse generating circuit shown in FIG. 1;

FIGS. 7A to 7E are timing charts illustrating a generation principle of a gate signal shown in FIG. 6;

FIG. 8 is a circuit diagram illustrating the internal structure of an LD driver shown in FIG. 1;

FIG. 9 is a circuit block diagram illustrating the internal structure of a mask circuit shown in FIG. 1;

FIGS. 10A to 10F are timing charts illustrating the relationships among a recording pulse, a gate pulse, and a reproduction signal;

FIG. 11 is a conceptual view illustrating a generating process of a flag signal executed by a CPU shown in FIG. 1;

FIGS. 12A to 12E are timing charts illustrating the relationships between a main beam for recording and a sub-beam for reproduction;

FIGS. 13A to 13G are timing charts illustrating the relationships among a recording pulse, a pulse obtained by delaying the recording pulse, and an RF signal;

FIG. 14 is a block diagram illustrating an example of a process of detecting a short pit or space during the recording of a long pit;

FIG. 15 is a block diagram illustrating the relationships between a counter 256 shown in FIG. 14 and a pulse generating circuit 300 shown in FIG. 1;

FIGS. 16A to 16C are conceptual views illustrating an example of a case in which a bit string is stored in a buffer 250-2 shown in FIG. 14;

FIGS. 17A to 17C are conceptual views illustrating the variation of a 4T space, which becomes a detection target, during the recording of a 14T pit;

FIG. 18 is a block diagram illustrating another example of the process of detecting a short pit or space during the recording of a long pit;

FIGS. 19A to 19G are timing charts illustrating an example of a process executed by a circuit block shown in FIG. 18;

FIGS. 20A to 20D are conceptual views illustrating a determination reference of a determination signal generated by the circuit block shown in FIG. 18;

FIG. 21 is a block diagram illustrating still another example of the process of detecting a short pit or space during the recording of a long pit;

FIGS. 22A to 22E are timing charts illustrating an example of a process executed by a circuit block shown in FIG. 21; and FIGS. 23A to 23D are timing charts illustrating an example of a process executed by a reset pulse generating circuit 426 shown in FIG. 21.

DETAILED DESCRIPTION OF THE PREFERRED EMBODIMENT

Hereinafter, an optical information recording device according to the invention will be described in detail with reference to the accompanying drawings. In addition, the invention is not limited to the following embodiments, and various modification and changes of the invention can be made without departing from the scope and spirit of the invention.

FIG. 1 is a block diagram illustrating the internal structure of a drive according to the invention. As shown in FIG. 1, a drive 100 performs an information recording or reproducing process on an optical disk 500, using a laser beam emitted from a laser diode 110 and transmits or receives data to or from an external apparatus, such as a personal computer 600.

When information is recorded on the optical disk 500, record data received from the personal computer 600 through an interface circuit 218 is encoded by an EFM encoder/decoder 216, and then the encoded record data is processed by a CPU 212. Then, a strategy, which is a recording condition on the optical disk 500, is determined, and the strategy is converted into recording pulses by a pulse generating circuit 300. Then, the recording pulses are output to an LD driver 124.

The LD driver 124 drives the laser diode 110 based on the input recording pulses, and the laser diode 110 controls an output laser beam corresponding to the recording pulses, such that the controlled laser beam is irradiated onto the optical disk 500, rotating at a constant linear velocity or a constant rotation speed, through a collimator lens 112, a diffraction grating 114, a half mirror 116, and an object lens 118, which allows recording patterns composed of pit and space strings corresponding to the desired record data to be recorded on the optical disk 500.

On the other hand, when the information recorded on the optical disk 500 is reproduced, a reproducing laser beam emitted from the laser diode 110 is irradiated onto the optical disk 500 through the collimator lens 112, the diffraction grating 114, the half mirror 116, and the object lens 118.

At that time, the intensity of the reproducing laser beam is lower than that of the recording laser beam, and the reflected light of the reproducing laser beam from the optical disk 500 travels to a detector 122 through the object lens 118, the half mirror 116, and a receiver lens 120 and is then converted into an electric signal.

The electric signal output from the detector 122 corresponds to the recording pattern composed of pits and spaces recorded on the optical disk 500 and is digitized into binary numbers by a slicer 210. Then, the digitized signal is decoded into a reproduction signal by the EFM encoder/decoder 216 to be output.

FIG. 2 is an exploded perspective view illustrating the structure of a pick-up unit incorporated into the drive shown in FIG. 1. As shown in FIG. 2, two diffraction gratings 114-1 and 114-2 are provided between the laser diode 110 and the optical disk 500, and grooves 115-1 and 115-2 formed in different directions are formed on the diffraction gratings 114-1 and 114-2, respectively.

When a laser beam 20 is irradiated onto the diffraction gratings having the above-mentioned structure, the laser beam is divided into three laser beams by the first diffraction grating 114-1, and one of the divided laser beams is further divided into three laser beams by the second diffraction grating 114-2. As a result, five spots 20A to 20E are irradiated onto the optical disk 500.

FIG. 3 is a plan view illustrating the landing positions of the spots irradiated onto the optical disk. As shown in FIG. 3, a main beam 20A for recording, a leading sub-beam 20B for tracking, a succeeding sub-beam 20C for tracking, a leading sub-beam 20D for reproduction, and a succeeding sub-beam 20E for reproduction are irradiated onto the optical disk 500.

Here, the main beam 20A for recording is irradiated onto a groove 502-2 formed on the optical disk 500, which allows a pit 506 to be formed in the groove 502-2. This main beam 20A for recording is set to have the highest light-emitting intensity so that the pits are formed through a heat mode.

The leading sub-beam 20B for tracking is irradiated onto a land 504-3 adjacent to the groove 502-2 onto which the main beam 20A is irradiated, and the succeeding sub-beam 20C for tracking is irradiated on a land 504-2 that is adjacent to the groove 502-2 onto which the main beam 20A is irradiated and that is opposite to the land 504-3 onto which the sub-beam 20B is irradiated.

The leading sub-beam 20D for reproduction is irradiated to precede the main beam 20A in a position, onto the same groove 502-2 where the main beam 20A is irradiated, and the succeeding sub-beam 20E for reproduction is irradiated to succeed the main beam 20A in a position, onto the same groove 502-2 where the main beam 20A is irradiated.

The positions of the respective spots located in this way make it possible to detect the recording pattern formed by the main beam 20A, that is, the recording pattern composed of a combination of the pit 506 and the space 508, using the succeeding sub-beam 20E for reproduction.

FIG. 4 is a conceptional view illustrating the relationships between the detector and the spots irradiated onto the optical disk. As shown in FIG. 4, the detector 122 shown in FIG. 1 has five optical receiving parts 122A to 122E, and reflected light components 22A to 22E corresponding to the spots 20A to 20E are respectively irradiated onto the optical receiving parts and are then converted into electric signals.

FIGS. 5A to 5E are conceptional views illustrating the relationships between the waveform of a recording pulse and a stable area. As shown in FIGS. 5A to 5E, the recording pulses having various waveforms are output from the LD driver 124 shown in FIG. 1, and each recording pulse includes a high output segment 50 indicating an ON state of the recording pulse, a low output segment 52 indicating an OFF state of the recording pulse, and a constant output portion 54 in which the recording pulse is in the ON state and little modulation occurs.

More specifically, FIG. 5A shows a recording pulse that is in an ON state and has a fixed output, and FIG. 5B shows a recording pulse having different amplitudes at a head part and a rear part. FIG. 5C shows a recording pulse having different amplitudes at a head part, a middle part, and a rear part, respectively, and FIG. 5D shows a recording pulse in which a fixed output portion is formed at a head part and then outputs are changed several times at a rear part.

In the present invention, it is intended that the reproduction signal be acquired in a state in which the recording pulse turns to an ON state. Therefore, it is preferable to generate a gate signal, which will be described in detail later, to correspond to the high output segment 50, and it is more preferable to generate the gate signal to correspond to the constant output portion 54 which is not easily affected by modulation. The constant output portion 54 is defined as a portion of the high output segment 50 that has a long interval and is in the most stable state. Alternatively, an area having a stable state shorter than that having the longest stable state can be used as the constant output portion. In addition, in the present embodiment, the pulse waveform shown in FIG. 5C, called a castle-type waveform, is given as an example. However, the invention can be applied to other recording pulses.

For example, it is preferable that, when the invention is applied to a recording power used for a phase change-type optical disk as shown in FIG. 5C, the gate signal be generated to correspond to the constant output portion 54 corresponding to deletion power, among the recording pulses composed of the high output segment 50 that becomes an amorphous state by repeatedly performing the high output and the low output to rapidly cool down a phase-change material, the low output segment 52 outputting a sufficient amount of power to perform servo control with the main beam, for example, a power of about 0.7 to 1 mW, and the constant output portion 54 that is turned to a crystal state by slow cooling, and that signals reproduced by the sub-beams be input to the constant output portion 54.

FIG. 6 is a circuit block diagram illustrating the internal structure of the pulse generating circuit shown in FIG. 1. As shown in FIG. 6, in the pulse generating circuit 300, the strategy conditions SD1 and SD2 output from the CPU 212 shown in FIG. 1 are transmitted to pulse unit generating circuits 310-1 and 310-2, respectively, to generate pulse signals PW1 and PW2 in synchronization with a clock signal CLK.

Here, the strategy conditions SD1 and SD2 are defined as numerical data in which the length of a period for which the pulse is in an ON state and the length of a period for which the pulse is in an OFF state are indicated by the number of clocks. The pulse unit generating circuits 310-1 and 310-2 having received the data generate pulse signals having conditions represented by the strategy conditions SD1 and SD2, using the clock signal CLK generated in the drive.

These pulse signals PW1 and PW2 are output to the LD driver 124 shown in FIG. 1, and the logical multiplication of an inversion signal of the pulse signal PW1 and the pulse signal PW2 is calculated by an AND computing unit 316. Then, the logical multiplication is output to a mask circuit 400 shown in FIG. 1 as a gate signal Gate. Here, an inversion signal of the pulse signal PW1 is generated by an inverting circuit 314.

FIGS. 7A to 7E are timing charts illustrating the generation principal of the gate signal shown in FIG. 6. As shown in FIGS. 7A to 7E, the gate signal corresponding to the constant output portion of the recording pulse is generated using the pulse signals PW1 and PW2 constituting the recording pulse. That is, as shown in FIGS. 7B and 7C, the pulse signals PW1 and PW2 are generated in synchronization with the clock signal CLK shown in FIG. 7A, and the inversion signal shown in FIG. 7D is generated from the pulse signal PW1.

Further, when the levels of the pulse signal PW2 in FIG. 7C and the inversion signal thereof in FIG. 7D are defined as shown in FIGS. 7C and 7D, respectively, the logical multiplication thereof is calculated, so that the gate signal shown in FIG. 7E is obtained. As a result, the gate signal obtained in this way corresponds to the constant output portion of the recording pulse.

FIG. 8 is a circuit diagram illustrating the internal structure of the LD driver shown in FIG. 1. As shown in FIG. 8, the LD driver 124 includes voltage dividing circuits respectively using resistors R1 and R2 and a synthesizing unit 126 for synthesizing voltages output from these voltage dividing circuits, and the pulse signals PW1 and PW2 from the pulse generating circuit 300 are amplified to predetermined output levels by the resistors R1 and R2, respectively. Then, the synthesizing unit 126 calculates the logical sum of the amplified signals to generate a recording pulse PWR, and the recording pulse PWR is output to the laser diode 110 shown in FIG. 1.

FIG. 9 is a circuit block diagram illustrating the internal structure of the mask circuit shown in FIG. 1. As shown in FIG. 9, the mask circuit 400 includes two AND computing units 410-1 and 410-2. The gate signal Gate generated by the pulse generating circuit 300 shown in FIG. 1 and a flag signal Flag generated by the CPU 212 shown in FIG. 1 are input to the first-stage AND computing unit 410-1. Then, the AND computing unit 410-1 calculates the logical multiplication of these signals to generate a gate signal Gate' and outputs it to the AND computing unit 410-2 in the next stage thereof.

The AND computing unit 410-2 puts a mask on an RF signal RF-Sub reproduced by the succeeding sub-beam 20E for reproduction that is output from the detector 122E shown in FIG. 4, using the gate signal Gate', to extract an RF signal RF-Sub' corresponding to the gate signal Gate', and then outputs it to the slicer 210 shown in FIG. 1. As a result, the RF signal RF-Sub' reproduced in the constant output portion of the recording pulse is selectively extracted, which enables high-precision pit detection.

Then, the CPU 212 shown in FIG. 1 calculates the correction conditions of strategy, based on the length or phase information of the detected pit and performs correction on the strategy conditions to be output to the pulse generating circuit 300. As a result, real time correction in which recording conditions are corrected during the recording of data is performed.

FIGS. 10A to 10F are timing charts illustrating the relationships among a recording pulse, a gate pulse, and a reproduction signal. As shown in FIG. 10A, the recording pulse PWR is a pulse pattern whose ON or OFF state is changed so as to correspond to a predetermined data pattern. Here, assuming that the constant output portion 54 of a pit 14T having the longest non-modulation area is used as a gate signal, the gate signal Gate generated by the pulse generating circuit 300 shown in FIG. 1 is output at the timing shown in FIG. 10B, and the flag signal Flag generated by the CPU 212 shown in FIG. 1 is output at the timing shown in FIG. 10C. In addition, the gate signal Gate' generated by the mask circuit 400 shown in FIG. 9 is output at the timing shown in FIG. 10D. Further, the RF signal RF-Sub' shown in FIG. 10F is extracted from the RF signal RF-Sub shown in FIG. 10E using the gate signal Gate'.

As such, since the finally extracted reproduction signal RF-Sub' is a signal reproduced in the constant output portion 54 of the recording pulse PWR, this signal enables the high-precision detection of pits and the accurate correction of strategy.

FIG. 11 is a conceptional view illustrating a generating process of the flag signal executed by the CPU shown in FIG. 1. More specifically, FIG. 11 shows an example in which a space 4T existing in the constant output portion of the pit 14T is selectively detected. As shown in FIG. 11, the CPU 212 sequentially stores numerical values corresponding to the data length of the recording pulse in a memory 214, specifies data whose space 4T (which is represented by 'L4' in FIG. 11) exists in the constant output portion of the pit 14T (which is represented by 'P14' in FIG. 11), and raises a flag to the specified data of the pit 14T.

Here, when a time difference between the main beam for recording and the sub-beam for reproduction is 'τ', the CPU 212 compares the length of data existing between the pit 14T and the space 4T with the time difference τ, converting the time difference τ into the number of clocks. As the result of comparison, when the data of the space 4T exists in a region spaced apart from the pit 14T by the time difference τ and in a range corresponding to the constant output portion of the pit 14T, the CPU 212 raises a flag to the pit 14T and then outputs the flag signal Flag at the timing shown in FIG. 10.

FIGS. 12A to 12E are timing charts illustrating the relationships between the main beam for recording and the sub-beam for reproduction. As shown in FIG. 12A, the output of the main beam for recording becomes a high-output pulse pattern required for forming a pit, and a pit pattern formed on the optical disk by irradiating this pulse becomes as shown in FIG. 12B.

On the other hand, as shown in FIG. 12C, the output of the sub-beam for reproduction becomes a pulse pattern having a lower output than the main beam for recording by a branching ratio, at the same timing as that of the output pattern of the main beam for recording. In addition, a pit pattern reproduced by the sub-beam for reproduction is a pattern delayed from the pit during recording by the time difference τ, as shown in FIG. 12D.

Therefore, when the space 4T reproduced during the recording of the pit 14T is detected, it is preferable to specify a position where the space 4T of a pulse obtained by delaying the pattern of the recording pulse by the time difference τ overlaps the constant output portion of the pit 14T of the recording pulse, as shown in FIG. 12E. That is, the following structure is useful: a first gate signal is generated from a constant output portion having a long pit in the recording pulse, a second gate signal is generated from a pulse corresponding to a short pit or space, which is a detection target, of a pulse pattern obtained by delaying the recording pulse by the time difference τ, and a mask is put on the RF signal obtained from the sub-beam for reproduction, using the first and second gate signals.

FIGS. 13A to 13G are timing charts illustrating the relationships among a recording pulse, a pulse obtained by delaying the recording pulse, and an RF signal. As shown in FIGS. 13A to 13G, a pulse PWR' is generated by delaying the recording pulse PWR by the time difference τ. In this case, when a portion of the delayed pulse PWR' in which the space 4T is included is the gate signal Gate' in the constant output portion of the pit 14T of the recording pulse PWR, it is possible to selectively detect a short pit or space while a long pit is being recorded, which makes it possible to accurately detect the length or phase variation of a pit.

FIG. 14 is a block diagram illustrating an example of a process of detecting a short pit or space while a long pit is being recorded. Specifically, FIG. 14 shows a structural example in which the EFM encoder/decoder 216 shown in FIG. 1 detects a 4T space existing under the sub-beam while the main beam records a 14T pit.

In the above-mentioned structure, as shown in FIG. 14, the EFM encoder/decoder 216 temporally stores a binary signal of 8 bits input from the slicer 210 shown in FIG. 1 in a buffer 250-1, and converts the 8-bit data output from the buffer into 16-bit data according to a conversion table 252 to output it to a buffer 250-2. At that time, a delay operation of a time T by a delay unit 254 is performed for every conversion.

The data stored in the buffer 250-2 is output to a counter 256. Then, the data is output from the counter to the pulse generating circuit 300 via the CPU 212 shown in FIG. 1 as data indicating a pulse length nT (where n is a natural number in the range of 3 to 14), so that the corresponding recording pulse is generated.

FIG. 15 is a block diagram illustrating the relationships between the counter 256 shown in FIG. 14 and the pulse generating circuit 300 shown in FIG. 1. As shown in FIG. 15, the counter 256 has a 14T decoder 258 for specifying a bit string corresponding to a 14T pit of a data stream flowing from the buffer 250-2 to the pulse generating circuit 300 and a 4T decoder 259 for specifying a bit string corresponding to a 4T space.

FIGS. 16A to 16C are conceptual views illustrating an example in which the buffer 250-2 shown in FIG. 14 stores a bit string. As shown in FIG. 16C, data indicating the length of a pit or space in synchronization with a clock signal shown in FIG. 16A is stored in the buffer 250-2.

For example, the length of 3T is represented by a binary number '100', and the length of 4T is represented by a binary number '1000'. In addition, the length of 5T is represented by a binary number '10000', and the length of 14T is represented by a binary number '10000000000000'.

Therefore, when a pulse shown in FIG. 16B is input, in the bit string stored in the buffer 250-2, a part corresponding to a 4T space is '1000' in binary number, and another part corresponding to a 14T pit is '10000000000000' in binary number, as shown in FIG. 16C. That is, the respective pulse widths are stored in a bit number format.

Here, when a gap between the main beam for recording and the sub-beam for reproduction corresponds to 300 bits, as shown in FIG. 16C, the position of the 14T pit currently being recorded is specified from the bit string stored in the buffer 250-2, and it is determined whether the bit string of the 4T space is located at a position spaced apart from the 14T pit by 300 bits.

As a result, when the bit string of the 4T space is located at that position, that point of time is determined as the timing when the 4T space can be detected by the sub-beam during the recording of the 14T pit by the main beam, and the conditions of real time correction are determined using a signal obtained at that timing.

FIGS. 17A to 17C are conceptual views illustrating the variation of the 4T space, which is a detection target during the recording of the 14T pit. As shown in FIG. 17A, when the recording pulse of the 14T pit is composed of a 3T pulse having a high output, a 9T pulse having a stable output, and a 2T pulse having a high output, a 4T space in the stable output area becomes a detection target.

Therefore, it is the most preferable to extract the 4T space appearing at the center of the 14T pulse. However, since the appearance probability of the 4T space is low at that position, the counter circuit is provided such that the 4T space becomes a detection target even if both ends of the 4T space are in the stable output area of the 14T pit.

For example, a gate signal shown in FIG. 17B is generated from a pulse of the 14T pit shown in FIG. 17A, and a data pattern capable of specifying the 4T space included in the gate signal, which is a hatched potion in FIG. 17C, is prepared. Then, a bit string corresponding to this data pattern is extracted.

FIG. 18 is a block diagram illustrating another example of the process of detecting a short pit or space during the recording of a long pit. Specifically, FIG. 18 shows an example in which it is determined whether the short pit or space exists during the recording of the long pit, based on the number of pulses generated for a certain period of time.

In a circuit block shown in FIG. 18, a binary signal SL RF-Sub' output from the slicer 210 is input to an AND computing unit 422 via an inverting circuit 420-1, and the gate signal Gate output from the pulse generating circuit 300 shown in FIG. 1 is also input to the AND computing unit 422.

The AND computing unit 422 calculates the logical multiplication of the input signals and outputs it to a set terminal of a counter 424. Then, the counter 424 having received the signal counts the number of pulses that are generated within the period of time indicated by the gate signal inverted by an inverting circuit 420-2 and outputs the count result to the CPU 212 shown in FIG. 1 as a determination signal Detection Enable. In addition, the gate signal inverted by the inverting circuit 420-2 is used as a reset signal of the counter 424.

The CPU 212 determines whether the 4T space exists during the recording of the 14T pit, based on whether the number of pulses indicated by the determination signal is a predetermined number or more, for example, two or more. As a result, when it is determined that the 4T space exists, the CPU 212 performs the fetch of a signal obtained from the 4T space.

FIGS. 19A to 19G are timing charts illustrating an example of a process executed by the circuit block shown in FIG. 18. As shown in FIG. 19A, a signal RF-Sub' input to the slicer 210 is digitized into a binary number at a certain level, so that a pulse signal SL RF-Sub' shown in FIG. 19B is generated.

Further, the determination signal Detection Enable shown in FIG. 19G is generated by calculating the logical multiplication of the gate signal Gate shown in FIG. 19E that is generated from the signals shown in FIGS. 19C and 19D by the pulse generating circuit 300 shown in FIG. 1 and the inversion signal shown in FIG. 19F that is generated by the inverting circuit 420-1.

FIGS. 20A to 20D are conceptual views illustrating a determination reference of the determination signal generated by the circuit block shown in FIG. 18. As shown in FIGS. 20A to 20D, when two or more pulses are counted within the interval shown in FIG. 20A, it is determined that the space included in the gate signal Gate indicating the stable area of 14T, for example, a space of 3T to 7T, exists during the recording of the 14T pit, and the CPU 212 performs the fetch of the signal obtained from the 4T space.

Therefore, as shown in FIG. 20B, when two pulses are counted in the gate signal, it is determined that the space included in the gate signal Gate indicating the stable area of 14T, for example, a space of 3T to 7T exists during the recording of the 14T pit, and the signal obtained from the 4T space is fetched. On the other hand, as shown in FIGS. 20C and 20D, when only one pulse is counted, it is determined that the 4T space does not exist during the recording of the 14T pit, so that the fetch of a signal is not performed.

FIG. 21 is a block diagram illustrating still another example of the process of detecting a short pit or space during the recording of a long pit. Specifically, FIG. 21 shows an example in which it is determined whether a short pit or space exists during the recording of a long pit by measuring the length of the pulse generated in the gate signal.

In the circuit block shown in FIG. 21, the AND computing unit 422 calculates the logical multiplication of the binary signal SL RF-Sub' output from the slicer 210, the gate signal Gate output from the pulse generating circuit 300 shown in FIG. 1, and the clock signal CLK, and then outputs the logical multiplication thereof to a set terminal of the counter 424 as a countable signal Countable Pulse. Then, the counter 424 calculates the length of the countable signal. In addition, a reset pulse generated by a reset pulse generating circuit 426 is input to the counter.

FIGS. 22A to 22E are timing charts illustrating an example of a process executed by the circuit block shown in FIG. 21. As shown in FIG. 22A, the signal RF-Sub' input to the slicer 210 is digitized into a binary number at a certain level, so that the pulse signal SL RF-Sub' shown in FIG. 22B is generated.

Therefore, the countable signal Countable Pulse shown in FIG. 22E is generated by the logical multiplication of the gate signal Gate shown in FIG. 22C that is generated by the pulse generating circuit 300 shown in FIG. 1 and the clock signal CLK shown in FIG. 22D. Here, the clock signal whose 1T is equal to one period is used. However, a high-speed clock whose 1T is equal to 40 periods, for example, may be used to improve the resolution of length detection.

FIGS. 23A to 23D are timing charts illustrating an example of the operation of the reset pulse generating circuit 426 shown in FIG. 21. As shown in FIGS. 23A to 23D, the reset pulse generating circuit 426 counts two clock signals CLK shown in FIG. 23A at one time to generate a middle signal CLK/2 shown in FIG. 23B and counts two middle signals CLK/2 at one time to generate a middle signal CLK/4 shown in FIG. 23C.

Further, as shown in FIG. 23D, the reset pulse generating circuit 426 generates a reset signal Reset that rises in synchronization with the second rising of the middle signal CLK/4 shown in FIG. 23C and that falls when a length corresponding to the gate signal Gate is scanned. The reset signal is input to the reset terminal of the counter 424 shown in FIG. 21 to reset the count result of the counter.

Furthermore, when a signal whose 1T is equal to 40 periods is used as the clock signal shown in FIG. 23A, and when the gate signal Gate has a width corresponding to 9T, the reset signal Reset shown in FIG. 23D falls when the clock signal is counted 360 times, so that the counter 424 is reset.

Similarly, when a signal whose 1T is equal to 2.5 periods is used as the clock signal shown in FIG. 23A, and when the gate signal Gate has a width corresponding to 9T, the reset signal Reset shown in FIG. 23D falls when the clock signal is counted 22.5 times, so that the counter 424 is reset. However, when the period of the clock signal is not an integral multiple of a unit length T, such as '1T=2.5 periods', it is treated as an integral multiple, such as '2T=5 periods'.

INDUSTRIAL APPLICABILITY

According to the invention, real time correction can be performed with high precision. Therefore, the invention can be applied to recording environments in which recording conditions vary at the inner or outer circumference of an optical disk.

What is claimed is:

1. An optical information recording device that writes information on an optical recording medium by pulse irradiation of a recording laser beam onto the optical recording medium and that detects the information by irradiating a reproduction laser beam onto the optical recording medium, wherein the recording laser beam and the reproduction laser beam are branched from a common laser beam, comprising:

a branching unit for branching the common laser beam into said recording laser beam and said reproduction laser beam;

a pulse generating unit that generates a recording pulse by calculating a logical sum of a first pulse and a second pulse;

an irradiation unit for pulse irradiation of the common laser beam in response to and during the recording pulse, such that the recording laser beam branched from the common laser beam is also pulse irradiated;

a gate pulse generating unit that generates a gate pulse by calculating a logical multiplication of the second pulse and an inversion of the first pulse; and a detecting unit that acquires a reproduction signal, generated be detecting the irradiated reproduction laser beam reflected from the optical recording medium, in response to and during the gate pulse.

* * * * *